(12) United States Patent
Kaehler

(10) Patent No.: US 11,055,530 B2
(45) Date of Patent: Jul. 6, 2021

(54) ACCUMULATION AND CONFIDENCE ASSIGNMENT OF IRIS CODES

(71) Applicant: MAGIC LEAP, INC., Plantation, FL (US)

(72) Inventor: Adrian Kaehler, San Diego, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/934,941

(22) Filed: Mar. 23, 2018

(65) Prior Publication Data

US 2018/0276467 A1 Sep. 27, 2018

Related U.S. Application Data

(60) Provisional application No. 62/476,513, filed on Mar. 24, 2017.

(51) Int. Cl.
| | | |
|---|---|---|
| *G06K 9/00* | (2006.01) | |
| *G06F 21/32* | (2013.01) | |
| *G02B 27/01* | (2006.01) | |
| *G06T 19/00* | (2011.01) | |
| *G06F 3/01* | (2006.01) | |

(52) U.S. Cl.
CPC ....... *G06K 9/00617* (2013.01); *G02B 27/017* (2013.01); *G02B 27/0172* (2013.01); *G06F 3/013* (2013.01); *G06F 21/32* (2013.01); *G06K 9/0061* (2013.01); *G06K 9/00604* (2013.01);
(Continued)

(58) Field of Classification Search
CPC ........... G06K 9/00617; G06K 9/00604; G06K 9/0061; G02B 27/017; G02B 27/0172; G02B 2027/0138; G02B 2027/014; G06F 3/013; G06F 21/32; G06T 19/006
See application file for complete search history.

(56) References Cited

U.S. PATENT DOCUMENTS 5,978,494 A * 11/1999 Zhang ................. G06K 9/6255
382/117
7,758,185 B2 7/2010 Lewis
(Continued)

FOREIGN PATENT DOCUMENTS

| EP | 0664037 A1 | 7/1995 |
|---|---|---|
| WO | 9409446 A1 | 4/1994 |

(Continued)

OTHER PUBLICATIONS

Daugman, J. (Jan. 2004). "How Iris Recognition Works," *IEEE Transactions on Circuits and Systems for Video Technology* 14(1):21-30.
(Continued)

*Primary Examiner* — Antonio Xavier
(74) *Attorney, Agent, or Firm* — Morrison & Foerster LLP

(57) ABSTRACT

Systems and methods pertaining to iris recognition are disclosed. A system is disclosed comprising an iris imager configured to acquire an iris image, and a processor configured to receive a first plurality of iris images from the iris imager, generate a first plurality of iris codes corresponding to the first plurality of iris images, generate a distribution metric corresponding to an iris cell location, generate a first composite iris code using the distribution metric, and generate a first match value using the first composite iris code and a first stored iris code.

19 Claims, 11 Drawing Sheets

(52) U.S. Cl.
CPC ...... *G06T 19/006* (2013.01); *G02B 2027/014* (2013.01); *G02B 2027/0138* (2013.01)

(56) References Cited

U.S. PATENT DOCUMENTS

| | | | |
|---|---|---|---|
| 8,353,594 B2 | 1/2013 | Lewis | |
| 8,696,113 B2 | 4/2014 | Lewis | |
| 8,733,927 B1 | 5/2014 | Lewis | |
| 8,733,928 B1 | 5/2014 | Lewis | |
| 9,010,929 B2 | 4/2015 | Lewis | |
| 9,189,686 B2 | 11/2015 | Bahjat | |
| 9,235,064 B2 | 1/2016 | Lewis | |
| 9,239,473 B2 | 1/2016 | Lewis | |
| 9,244,293 B2 | 1/2016 | Lewis | |
| 9,658,473 B2 | 5/2017 | Lewis | |
| 10,151,937 B2 | 12/2018 | Lewis | |
| 10,185,147 B2 | 1/2019 | Lewis | |
| 2008/0037835 A1* | 2/2008 | Lee | G06K 9/0061 382/117 |
| 2010/0014755 A1* | 1/2010 | Wilson | G06K 9/00604 382/173 |
| 2015/0016777 A1 | 1/2015 | Abovitz et al. | |
| 2015/0098630 A1* | 4/2015 | Perna | G06K 9/00617 382/117 |
| 2015/0178939 A1 | 6/2015 | Bradski et al. | |
| 2015/0326570 A1* | 11/2015 | Publicover | G02B 27/017 726/4 |
| 2016/0259986 A1* | 9/2016 | Yun | G02B 27/017 |
| 2016/0269178 A1* | 9/2016 | Yang | H04L 9/3231 |
| 2016/0270656 A1 | 9/2016 | Samec et al. | |
| 2016/0364611 A1* | 12/2016 | Krichen | G06T 7/11 |
| 2017/0032174 A1 | 2/2017 | Mathieu | |
| 2017/0091996 A1 | 3/2017 | Wei et al. | |
| 2017/0109936 A1 | 4/2017 | Powderly et al. | |
| 2017/0255822 A1* | 9/2017 | Kwak | G06K 9/00912 |

FOREIGN PATENT DOCUMENTS

| | | |
|---|---|---|
| WO | 2009029638 A1 | 3/2009 |
| WO | WO2018176015 A1 | 9/2018 |

OTHER PUBLICATIONS

International Search Report and Written Opinion dated Jun. 6, 2018 for PCT Application No. PCT/US2018/024215 filed on Mar. 23, 2018, thirteen pages.

Daugman, J. (Nov. 1, 1993). "High confidence visual recognition of persons by a test of statistical independence," IEEE Transactions on pattern analysis and machine intelligence, IEEE computer society, USA, vol. 15, No. 11, pp. 1148-1161, XP000413106, ISSN: 0162-8828, DOI: 10.1109/34.244676, *the whole document*.

Daugman, J. (Sep. 22, 2002). "How Iris Recognition Works," International Conference on Image Processing (ICIP), IEEE, vol. 1, pp. I-33-I-36, XP001148405, ISBN: 978-0-7803-7622-9 *the whole document*.

European Search Report dated Feb. 26 2020, for EP Application No. 18771354.0, thirteen pages.

Jacob, Robert J.K. (1985). "Eye Tracking in Advanced Interface Design," Human-Computer Interaction Lab, Naval Research Laboratory, Washington D.C., 50 pages.

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

\* cited by examiner

ACCUMULATION AND CONFIDENCE ASSIGNMENT OF IRIS CODES

CROSS REFERENCE TO RELATED APPLICATIONS

This application claims benefit of U.S. Provisional Application No. 62/476,513, filed Mar. 24, 2017, the content of which is incorporated herein by reference in its entirety.

FIELD

The disclosed examples relate generally to iris recognition, including iris recognition systems used for access control or identity screening, as well as systems incorporated into user-wearable devices, including head-mounted display devices.

BACKGROUND

The iris of the human eye presents a visual pattern that generally is unique and permanent with respect to an individual user, is consistent over time, and can be reliably imaged. Recognition and analysis of iris image data can thus be an advantageous mechanism for identifying an individual user. Systems designed to recognize the iris of the human eye are particularly useful in security and access control applications. Such systems benefit from being accurate, reliable, and usable under many conditions. It is thus desirable for iris recognition systems to be tolerant of variations in image acquisition and quality, subject state, orientation and lighting conditions, for example; and to be accurate, including by realizing low rates of false acceptances and false rejections.

BRIEF SUMMARY

Described herein are devices and methods for performing iris recognition. In some examples, an iris image is acquired, for example by a camera from a human user of a system, and a bitwise representation of the iris image (an "iris code") is generated. In some examples, an iris code is generated by normalizing and dividing the iris image into cells, using known methods (such as filtering techniques or wavelet techniques) to determine orientation data corresponding to iris structure in that cell, and assigning a binary representation to that orientation data. In some examples, variable cells of a generated iris code may be identified and excluded to adjust and improve the accuracy of iris code comparisons. In some examples, generated iris codes are accumulated and used to produce "fuzzy" iris code values; the application of various statistical methods to these fuzzy iris code values may result in improved accuracy of iris code comparisons.

DETAILED DESCRIPTION

Example 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a virtual reality (VR), AR, or mixed reality (MR) environment, alone or in combination, for user interaction. The wearable device can be used interchangeably as an AR device (ARD). Further, for the purpose of the present disclosure, the term "AR" is used interchangeably with the term "MR".

Figure 1:
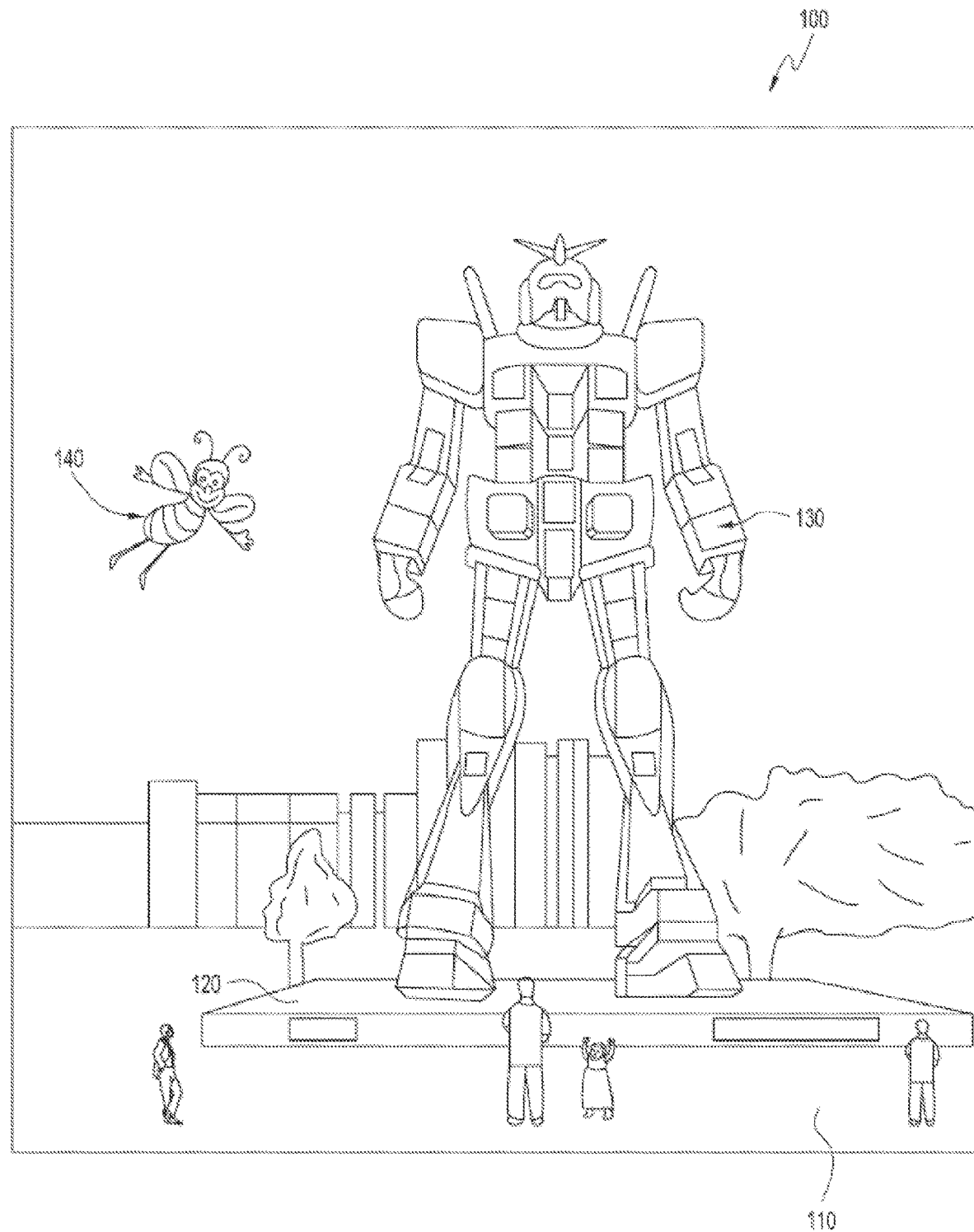
FIG. 1 depicts a mixed reality scenario with virtual reality objects and physical objects viewed by a person.

FIG. 1 depicts an illustration of a mixed reality scenario with certain VR objects, and certain physical objects viewed by a person, according to some embodiments. In FIG. 1, an MR scene 100 is depicted wherein a user of a MR technology sees a real-world park-like setting 110 featuring people, trees, buildings in the background, and a concrete platform 120. In addition to these items, the user of the MR technology also perceives that they "see" a robot statue 130 standing upon the concrete platform 120, and a cartoon-like avatar character 140 flying by which seems to be a personification of a bumble bee, even though these elements do not exist in the real-world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surf ace depth.

VR, AR, and MR experiences can be provided by display systems having displays in which images corresponding to one or more depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
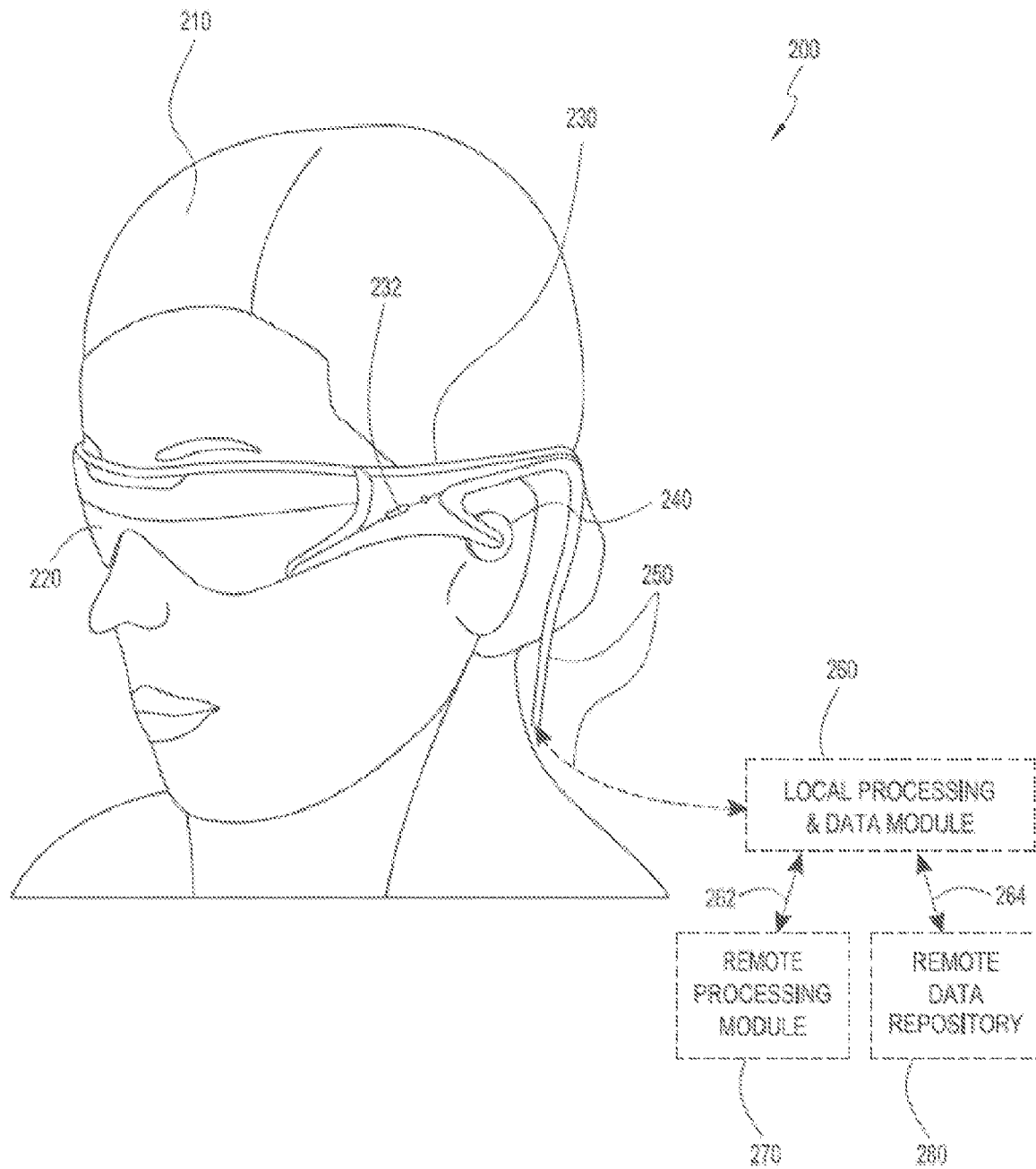
FIG. 2 depicts an example of a wearable system.

FIG. 2 illustrates an example of wearable system 200 which can be configured to provide an AR/VR/MR scene, according to some embodiments. The wearable system 200 can also be referred to as an AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present an AR/VR/MR scene to the user 210. The display 220 can include a head mounted display (HMD) that is worn on a head of the user 210.

In some embodiments, a speaker 240 is coupled to the frame 230 and positioned adjacent an ear canal of the user 210 (in some embodiments, another speaker, not shown, is positioned adjacent another ear canal of the user 210 to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user 210. The wearable system 200 can also include an inward-facing imaging system 462 (shown in FIG. 4) which can track the eye movements of the user 210. The inward-facing imaging system 462 may track either one eye's movements or both eyes' movements. The inward-facing imaging system 462 take images of irises of the user 210, and the images of the irises of the user 210 may be used to generate a bitwise representation of the iris image (an "iris code"). The inward-facing imaging system 462 may be attached to the frame 230 and may be in electrical communication with modules 260 or 270, which may process image information acquired by the inward-facing imaging system 462 to determine, for example, the pupil diameters or orientations of the eyes, eye movements or eye pose of the user 210, a bitwise representation of an iris image (an "iris code"), and the like. The inward-facing imaging system 462 may include one or more cameras. For example, at least one camera may be used to image each eye. The images acquired by the cameras may be used to determine pupil size, eye pose, and/or iris code, for each eye separately As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local processing and data module 260 which may be mounted in a variety of configurations, such as fixedly attached to the frame 230, fixedly attached to a helmet or hat worn by the user 210, embedded in headphones, or otherwise removably attached to the user 210 (e.g., in a backpack-style configuration, in a belt-coupling style configuration).

The local processing and data module 260 may include a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system 462 or the outward-facing imaging system 464), audio sensors (e.g., microphones 232), inertial measurement units (IMUs), accelerometers, compasses, global positioning system (GPS) units, radio devices, or gyroscopes; or b) acquired or processed using a remote processing module 270 or a remote data repository 280, possibly for passage to the display 220 after such processing or retrieval. The local processing and data module 260 may be operatively coupled by communication links 262 and/or 264, such as via wired or wireless communication links, to the remote processing module 270 and/or the remote data repository 280 such that these remote modules are available as resources to the local processing and data module 260. In addition, the remote processing module 280 and the remote data repository 280 may be operatively coupled to each other.

In some embodiments, the remote processing module 270 may include one or more processors configured to analyze and process data or image information. In some embodiments, the remote data repository 280 may include a digital data storage facility, which may be available through the internet or other networking configuration in a "cloud" resource configuration. In some embodiments, all data is stored and all computations are performed in the local processing and data module 260, allowing fully autonomous use from a remote module.

Example Wearable System

Figure 3:
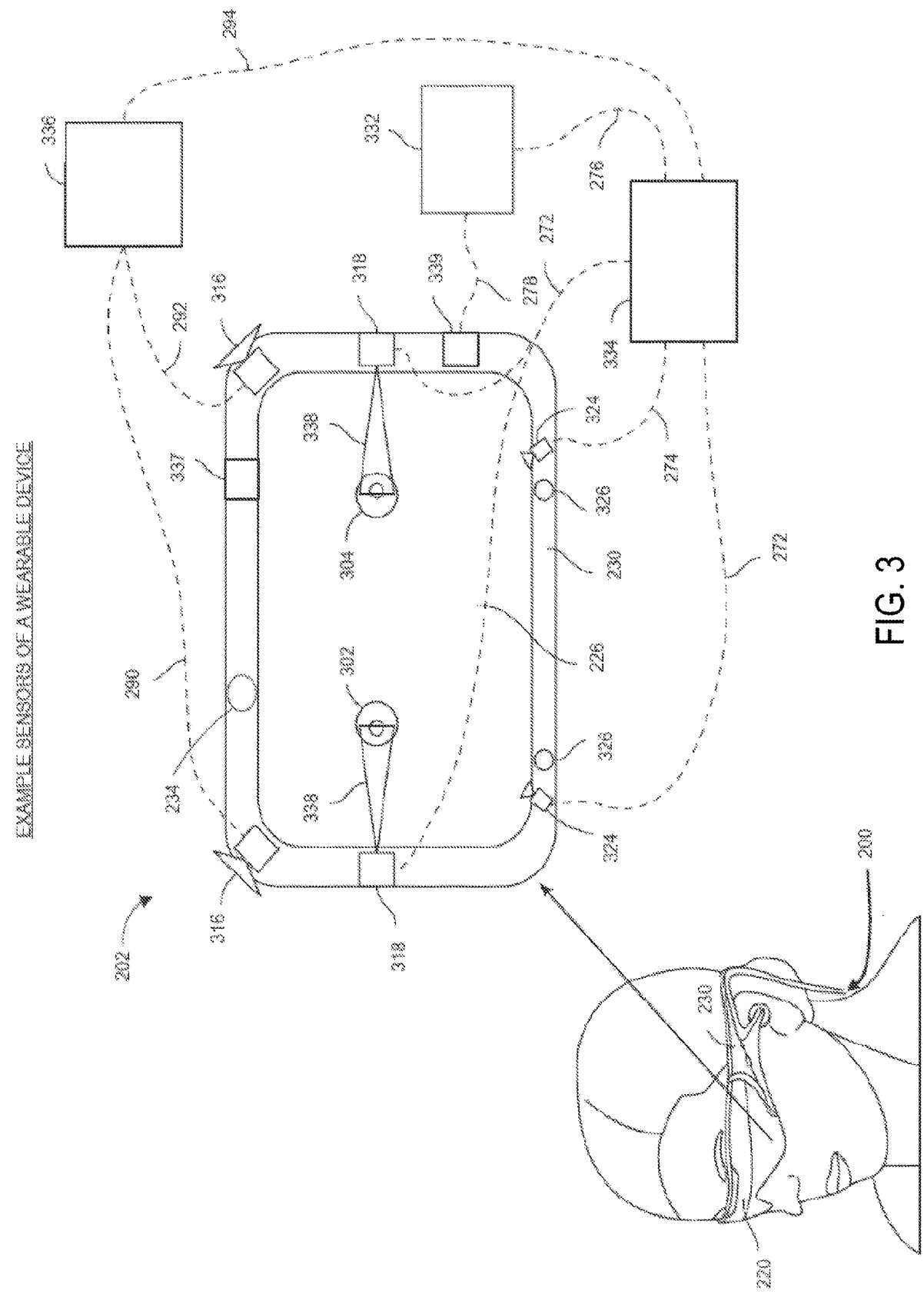
FIG. 3 depicts example components of a wearable system.

FIG. 3 schematically illustrates example components of a wearable system, according to some embodiments. FIG. 3 shows a wearable system 200 which can include a display 220 and a frame 230. A blown-up view 202 schematically illustrates various components of the wearable system 200. In some embodiments, one or more of the components illustrated in FIG. 3 can be part of the display 220. The various components alone or in combination can collect a variety of data (such as e.g., audio or visual data) associated with the user 210 of the wearable system 200 or of the user's environment. It should be appreciated that other embodiments may have additional or fewer components depending on the application for which the wearable system 200 is used. Nevertheless, FIG. 3 provides an idea of some of the various components and types of data that may be collected, analyzed, and stored through the wearable system 200.

FIG. 3 shows an example wearable system 200 which can include the display 220. The display 220 can include a display lens 226 that may be mounted to the head of the user 210 or a housing which corresponds to the frame 230. The display lens 226 may include one or more transparent mirrors positioned by the frame 230 in front of eyes 302, 304 of the user 210 and may be configured to bounce projected light 338 into the eyes 302, 304 and facilitate beam shaping, while also allowing for transmission of at least some light from the local environment. A wavefront of the projected light 338 may be bent or focused to coincide with a desired focal distance of the projected light. As illustrated, two wide-field-of-view machine vision cameras 316 (also referred to as world cameras) can be coupled to the frame 230 to image the environment around the user 210. These cameras 316 can be dual capture visible light/non-visible (e.g., infrared) light cameras 316. The cameras 316 may be part of the outward-facing imaging system 464 shown in FIG. 4. Image acquired by the cameras 316 can be processed by the pose processor 336. For example, the pose processor 336 can implement one or more object recognizers to identify a pose of the user 210 or another person in the environment of the user 210 or to identify a physical object in the environment of the user 210.

A pair of scanned-laser shaped wavefront (e.g., for depth) light projector modules with display mirrors and optics configured to project light 338 into the eyes 302, 304 are shown. The depicted view also shows two miniature infrared (IR) cameras 324 paired with IR light sources 326 (such as light emitting diodes "LED"s), which are configured to be able to track the eyes 302, 304 of the user 210 to support rendering, user input, iris code generation, and the like. The IR cameras 324 may be part of the inward-facing imaging system 462 shown in FIG. 4. The wearable system 200 can further feature a sensor assembly 339, which may include X, Y, and Z axis accelerometer capability as well as a magnetic compass and X, Y, and Z axis gyro capability, preferably providing data at a relatively high frequency, such as 200 Hz. The sensor assembly 339 may be part of an IMU. The wearable system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A. The wearable system can also include one or more depth sensors 234. The depth sensor 234 can be configured to measure the distance between an object in an environment to a wearable device. The depth sensor 234 may include a laser scanner (e.g., LIDAR), an ultrasonic depth sensor, or a depth sensing camera. In certain implementations, where the cameras 316 have depth sensing ability, the cameras 316 may also be considered as depth sensors 234. Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 can also include a position system such as, for example, a GPS 337 (global positioning system) to assist with pose and positioning analyses. In addition, the GPS 337 may further provide remotely-based (e.g., cloud-based) information about the environment of the user 210. This information may be used for recognizing objects or information in environment of the user 210.

The wearable system 200 may combine data acquired by the GPS 337 and a remote computing system (such as, e.g., the remote processing module 270, another user's ARD, etc.) which can provide more information about the environment of the user 210. As one example, the wearable system 200 can determine the location of the user 210 based on GPS data and retrieve a world map (e.g., by communicating with the remote processing module 270) including virtual objects associated with the location of the user 210. As another example, the wearable system 200 can monitor the environment of the user 210 using the cameras 316 (which may be part of the outward-facing imaging system 464 shown in FIG. 4). Based on the images acquired by the cameras 316, the wearable system 200 can detect objects in the environment. The wearable system 200 can further use data acquired by the GPS 337 to interpret the objects.

The wearable system 200 may also include a rendering engine 334 which can be configured to provide rendering information that is local to the user 210 to facilitate operation of the scanners and imaging into the eyes 302, 304 of the user 210, for a view of the world for of the user 210. The rendering engine 334 may be implemented by a hardware processor (such as, for example, a central processing unit or a graphics processing unit). In some embodiments, the rendering engine 334 is part of the local processing and data module 260. The rendering engine 334 can be communicatively coupled (e.g., via wired or wireless links) to other components of the wearable system 200. For example, the rendering engine 334, can be coupled to the IR cameras 324 via communication link 274, and be coupled to a projecting subsystem 318 (which can project light into eyes 302, 304 of the user 210 via a scanned laser arrangement in a manner similar to a retinal scanning display) via the communication link 272. The rendering engine 334 can also be in communication with other processing units such as, for example, a sensor pose processor 332 and the pose processor 336 via links 276 and 294, respectively.

The IR cameras 324 (e.g., mini infrared cameras) may be utilized to track the eyes to support rendering, user input, iris code generation, and the like. Some example eye poses may include where the user is looking or at what depth he or she is focusing (which may be estimated with eye vergence). The GPS 337, gyros, compass, and accelerometers, sensor assembly 339, and the like may be utilized to provide coarse or fast pose estimates. One or more of the cameras 316 can acquire images and pose, which in conjunction with data from an associated cloud computing resource, may be utilized to map the local environment and share views of the user 210 with other users.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the pose processor 336, sensor pose processor 332, and rendering engine 334 may be positioned in a beltpack and configured to communicate with other components of the wearable system 200 via wireless communication, such as ultra-wideband, Wi-Fi, Bluetooth, and the like, or via wired communication. The depicted frame 230 preferably is head-mountable and wearable by the user 210. However, some components of the wearable system 200 may be worn to other portions of the body of the user 210. For example, the speaker 240 may be inserted into the ears of the user 210 to provide sound to the user 210.

Regarding the projected light 338, in some embodiment, the IR cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the IR cameras 324, and the rendering engine 334 and projecting subsystem 318 may be utilized to render all objects on or close to the horopter in focus, and all other objects at varying degrees of defocus (e.g., using intentionally-created blurring). Preferably, the display 220 renders to the user at a frame rate of about 60 frames per second or greater. As described above, preferably, the IR cameras 324 may be utilized for eye tracking, and software may be configured to pick up not only vergence geometry but also focus location cues to serve as user inputs, and also iris coder generation. Preferably, such a display system is configured with brightness and contrast suitable for day or night use.

In some embodiments, the display 220 preferably has latency of less than about 20 milliseconds for visual object alignment, less than about 0.1 degree of angular alignment, and about 1 arc minute of resolution, which, without being limited by theory, is believed to be approximately the limit of the human eye. The display 220 may be integrated with a localization system, which may involve GPS elements, optical tracking, compass, accelerometers, or other data sources, to assist with position and pose determination; localization information may be utilized to facilitate accurate rendering in the view of the user 210 of the pertinent world (e.g., such information would facilitate the glasses to know where they are with respect to the real world).

In some embodiments, the wearable system 200 is configured to display one or more virtual images based on the accommodation of the eyes 302, 304 of the user 210. Unlike other 3D display approaches that force the user 210 to focus where the images are being projected, in some embodiments, the wearable system 200 is configured to automatically vary the focus of projected virtual content to allow for a more comfortable viewing of one or more images presented to the user 210. For example, if the eyes 302, 304 of the user 210 have a current focus of 1 m, the image may be projected to coincide with the focus of the user 210. If the user 210 shifts focus to 3 m, the image is projected to coincide with the new focus. Thus, rather than forcing the user 210 to a predetermined focus, the wearable system 200, in some embodiments, allows the eyes 302, 304 of the user 210 to a function in a more natural manner.

Such a wearable system 200 may eliminate or reduce the incidences of eye strain, headaches, and other physiological symptoms typically observed with respect to VR devices. To achieve this, various embodiments of the wearable system 200 are configured to project virtual images at varying focal distances, through one or more variable focus elements (VFEs). In some embodiments, 3D perception may be achieved through a multi-plane focus system that projects images at fixed focal planes away from the user 210. Some embodiments employ variable plane focus, wherein the focal plane is moved back and forth in the z-direction to coincide with the present state of focus of the user 210.

In both the multi-plane focus systems and variable plane focus systems, wearable system 200 may employ eye tracking to determine a vergence of the eyes 302, 304, determine the current focus of the user 210, and project the virtual image at the determined focus. In other embodiments, the wearable system 200 includes a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some embodiments, a spatial light modulator may project the images to the user 210 through various optical components. For example, as described further below, the spatial light modulator may project the images onto one or more waveguides, which then transmit the images to the user 210.

Waveguide Stack Assembly

Figure 4:
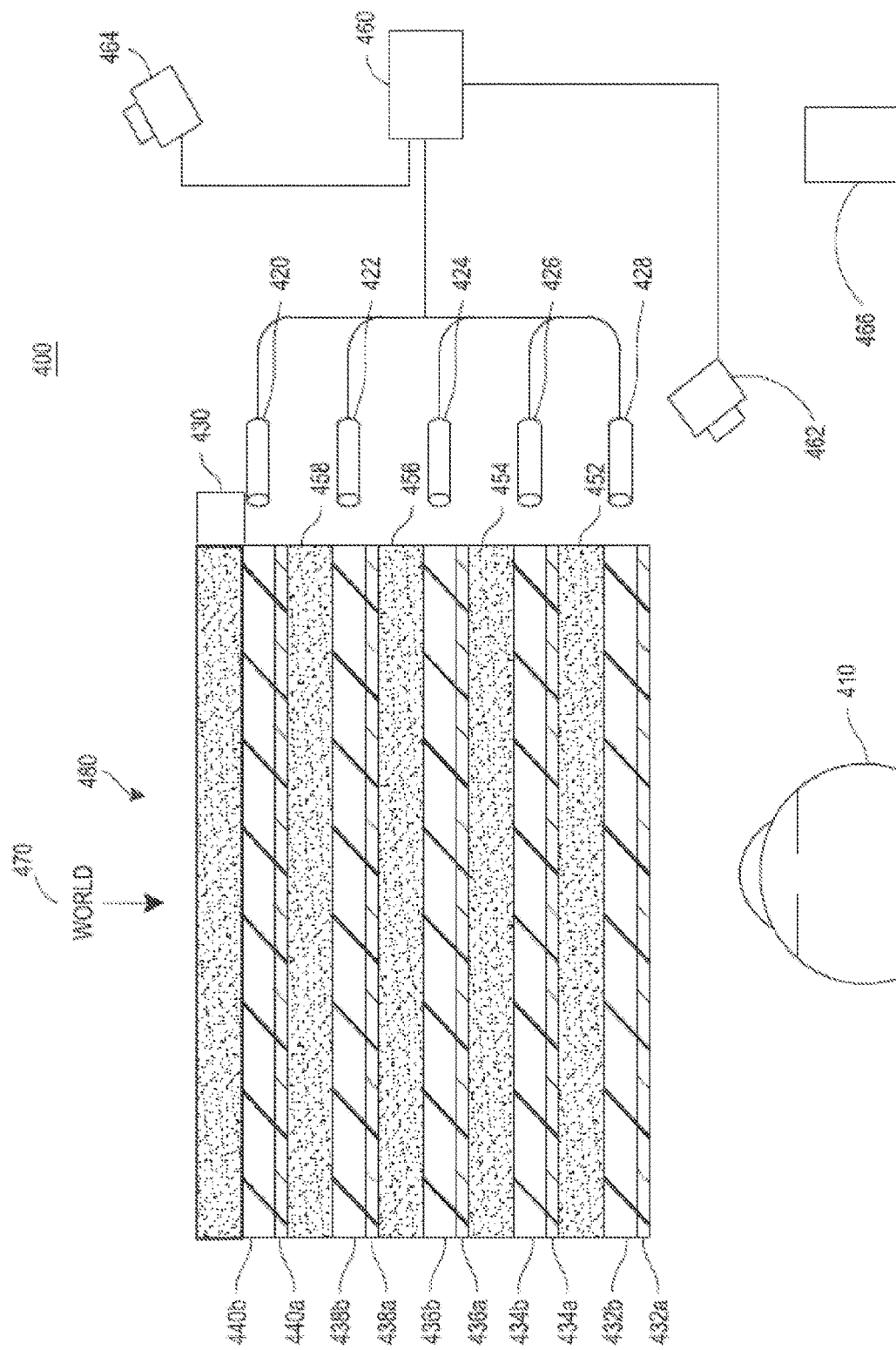
FIG. 4 depicts an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422,

424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456,454, 452 below. (Compensating lens layer 430 and the stacked waveguide assembly 480 as a whole may be configured such that light coming from the world 470 is conveyed to the eye 410 at substantially the same level of divergence (or collimation) as the light had when it was initially received by the stacked waveguide assembly 480.) Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4n steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUS, accelerometers, gyroscopes, and the like.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of a Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surf aces of the totem. For example, the wearable system may render an image of a computer keyboard and trackpad to appear to reside on one or more surf aces of a totem. For example, the wearable system may render a virtual computer keyboard and virtual trackpad to appear on a surf ace of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Eye Image

Figures 5, 5A:
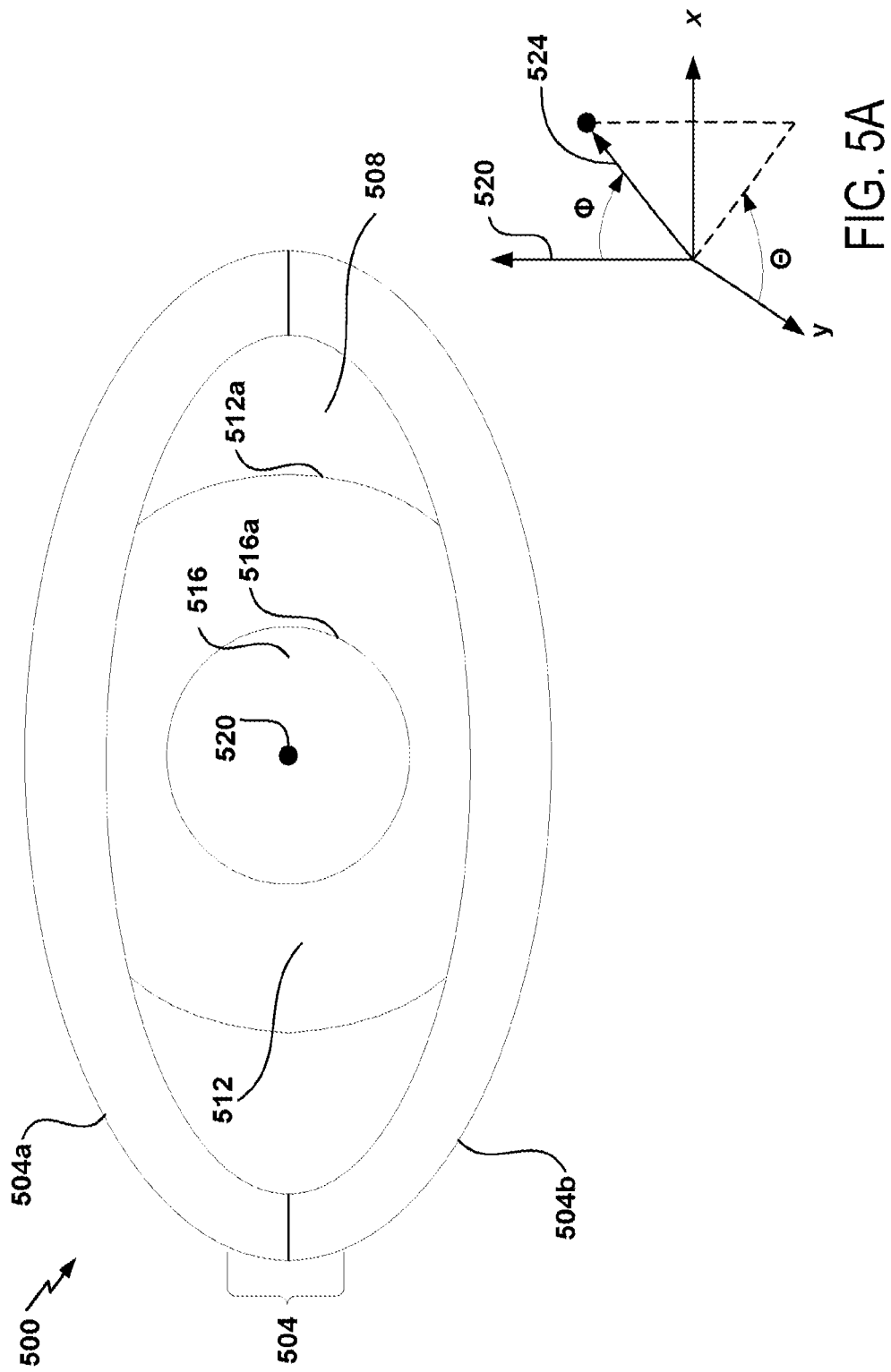
FIG. 5 depicts an example of an eye.
FIG. 5A depicts an example coordinate system for determining an eye pose of an eye.

FIG. 5 illustrates an image of an eye 500 with eyelids 504, sclera 508 (the "white" of the eye), iris 512, and pupil 516. A curve 516a shows the pupillary boundary between the pupil 516 and the iris 512, and curve 512a shows the limbic boundary between the iris 512 and the sclera 508. The eyelids 504 include an upper eyelid 504a and a lower eyelid 504b. The eye 500 is illustrated in a natural resting pose (e.g., in which the user's face and gaze are both oriented as they would be toward a distant object directly ahead of the user). The natural resting pose of the eye 500 can be indicated by a natural resting direction 520, which is a direction orthogonal to the surface of the eye 500 when in the natural resting pose (e.g., directly out of the plane for the eye 500 shown in FIG. 5) and in this example, centered within the pupil 516.

As the eye 500 moves to look toward different objects, an eye pose will change relative to the natural resting direction 520. The current eye pose can be determined with reference to an eye pose direction 524, which is a direction orthogonal to the surface of the eye 500 (and centered in within the pupil 516) but oriented toward the object at which the eye is currently directed. With reference to an example coordinate system shown in FIG. 5A, the pose of the eye 500 can be expressed as two angular parameters indicating an azimuthal deflection and a zenithal deflection of the eye pose direction 524 of the eye, both relative to the natural resting direction 520 of the eye. For purposes of illustration, these angular parameters can be represented as $\theta$ (azimuthal deflection, determined from a fiducial azimuth) and $\phi$ (zenithal deflection, sometimes also referred to as a polar deflection). In some embodiments, angular roll of the eye around the eye pose direction 524 can be included in the determination of eye pose, and angular roll can be included in the following analysis. In some embodiments, other techniques for determining the eye pose can be used, for example, a pitch, yaw, and optionally roll system.

An eye image can be obtained from a video using any appropriate process, for example, using a video processing algorithm that can extract an image from one or more sequential frames. The pose of the eye can be determined from the eye image using a variety of eye-tracking techniques. For example, an eye pose can be determined by considering the lensing effects of the cornea on light sources that are provided. Any suitable eye tracking technique can be used for determining eye pose in the eyelid shape estimation techniques described herein.

Example Eye Tracking System

Figure 6:
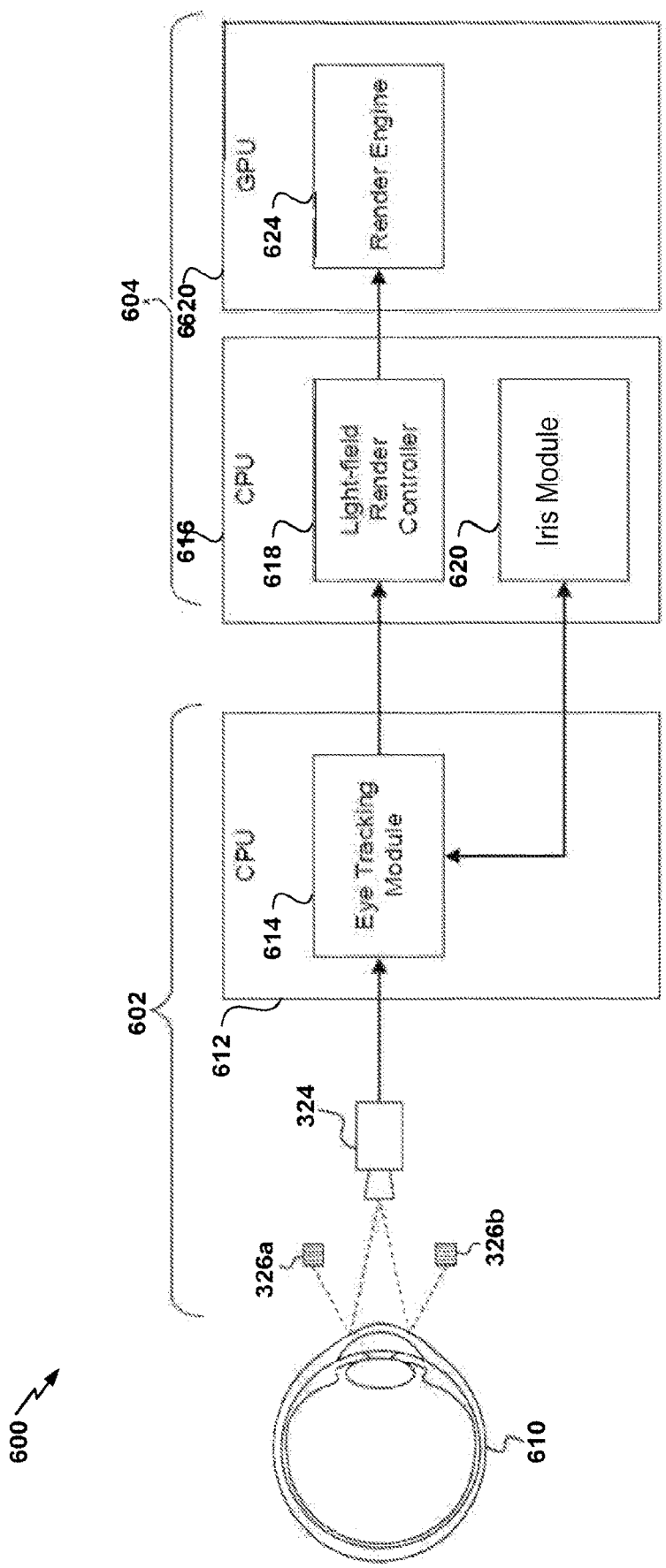
FIG. 6 depicts a wearable system that includes an eye tracking system.

FIG. 6 illustrates a schematic diagram of a wearable system 600 that includes an eye tracking system. The wearable system 600 may, in some embodiments, include components located in a head-mounted unit 602 and components located in a non-head-mounted unit 604. The non-head-mounted unit 604 may be, as examples, a belt-mounted component, a hand-held component, a component in a backpack, a remote component, and the like. Incorporating some of the components of the wearable system 600 in non-head-mounted unit 604 may help to reduce the size, weight, complexity, and cost of the head mounted unit 602. In some implementations, some or all of the functionality described as being performed by one or more components of the head-mounted unit 602 and/or the non-head mounted 604 may be provided by way of one or more components included elsewhere in the wearable system 600. For example, some or all of the functionality described below in association with a CPU 612 of head-mounted unit 602 may be provided by way of a CPU 616 of non-head-mounted unit 604, and vice versa. In some examples, some or all of such functionality may be provided by way of peripheral devices of wearable system 600. Furthermore, in some implementations, some or all of such functionality may be provided by way of one or more cloud computing devices or other remotely-located computing devices in a manner similar to that which has been described above with reference to FIG. 2.

As shown in FIG. 6, wearable system 600 can include an eye tracking system including a camera 324 that captures images of an eye 610 of the user. If desired, the eye tracking system may also include light sources 326a and 326b (such as light emitting diodes "LED"s). The light sources 326a and 326b may generate glints (i.e., reflections off of the eye 610 that appear in images of the eye captured by camera 324). The positions of the light sources 326a and 326b relative to the camera 324 may be known and, as a consequence, the positions of the glints within images captured by the camera 324 may be used in tracking the eye 610. In some embodiments, there may be one light source 326 and one camera 324 associated with a single one of the eyes 610. In some embodiment, there may be one light source 326 and one camera 324 associated with each of the eyes. 610. In some embodiments, there may be one or more cameras 324 and one or more light sources 326 associated with one or each of the eyes 610. In some embodiments, there may be two light sources 326a and 326b and one or more cameras 324 associated with each of the eyes 610. In some embodiments, there may be three or more light sources such as light sources 326a and 326b and one or more cameras 324 associated with each of the eyes 610.

Eye tracking module 614 may receive images from eye tracking camera(s) 324 and may analyze the images to extract various pieces of information. As examples, the eye tracking module 614 may detect poses of the eye 610, a three-dimensional position of the eye 610 relative to the eye tracking camera 324 (and to the head-mounted unit 602), the direction one or both of the eyes 610 are focused on, the user's vergence depth (i.e., the depth from the user at which the user is focusing on), the positions of the pupils, the positions of the cornea and cornea sphere, the center of rotation of each of the eyes, and the center of perspective of each of the eyes, the iris of the eyes, and the like. As shown in FIG. 6, the eye tracking module 614 may be a module implemented using a CPU 612 in a head-mounted unit 602.

Data from the eye tracking module 614 may be provided to other components in the wearable system 600. As example, such data may be transmitted to components in a non-head-mounted unit 604 such as CPU 616 including modules for a light-field render controller 618 and an iris module 620.

The render controller 618 may use information from eye tracking module 614 to adjust images displayed to the user by render engine 624 (e.g., a render engine that may be a module in a GPU 6620 and that may provide images to the display 220).

A "render camera," which is sometimes also referred to as a "pinhole perspective camera" (or simply "perspective camera") or "virtual pinhole camera" (or simply "virtual camera"), is a simulated camera for use in rendering virtual image content possibly from a database of objects in a virtual world. The objects may have locations and orientations relative to the user or wearer and possibly relative to real objects in the environment surrounding the user or wearer. In other words, the render camera may represent a perspective within render space from which the user or wearer is to view 3D virtual contents of the render space (e.g., virtual objects). The render camera may be managed by the render engine 624 to render virtual images based on the database of virtual objects to be presented to the eye 610. The virtual images may be rendered as if taken from the perspective the user. For example, the virtual images may be rendered as if captured by a pinhole camera (corresponding to the "render camera") having a specific set of intrinsic parameters (e.g., focal length, camera pixel size, principal point coordinates, skew/distortion parameters, etc.), and a specific set of extrinsic parameters (e.g., translational components and rotational components relative to the virtual world). The virtual images are taken from the perspective of such a camera having a position and orientation of the render camera (e.g., extrinsic parameters of the render camera). It follows that the system may define and/or adjust intrinsic and extrinsic render camera parameters. For example, the system may define a particular set of extrinsic render camera parameters such that virtual images may be rendered as if captured from the perspective of a camera having a specific location with respect to the eye so as to provide images that appear to be from the perspective of the user. The system may later dynamically adjust extrinsic render camera parameters on-the-fly so as to maintain registration with said specific location. Similarly, intrinsic render camera parameters may be defined and dynamically adjusted over time. In some implementations, the images are rendered as if captured from the perspective of a camera having an aperture (e.g., pinhole) at a specific location with respect to the user's or wearer's eye (such as the center of perspective or center of rotation, or elsewhere).

In some embodiments, the system may create or dynamically reposition and/or reorient one render camera for the user's left eye, and another render camera for the user's right eye, as the user's eyes are physically separated from one another and thus consistently positioned at different locations. It follows that, in at least some implementations, virtual content rendered from the perspective of a render camera associated with the viewer's left eye may be presented to the user through an eyepiece on the left side of a head-mounted display (e.g., the head-mounted unit 602), and that virtual content rendered from the perspective of a render camera associated with the right eye may be presented to the user through an eyepiece on the right side of such a head-mounted display. Further details discussing the creation, adjustment, and use of render cameras in rendering processes are provided in U.S. patent application Ser. No. 15/274,823, entitled "METHODS AND SYSTEMS FOR DETECTING AND COMBINING STRUCTURAL FEATURES IN 3D RECONSTRUCTION," which is expressly incorporated herein by reference in its entirety for all purposes.

In some examples, one or more modules (or components) of the wearable system 600 (e.g., light-field render controller 618, render engine 624, and the like) may determine the position and orientation of the render camera within render space based on the position and orientation of the user's head and eyes (e.g., as determined based on head pose and eye tracking data, respectively). That is, the wearable system 600 may effectively map the position and orientation of the user's head and eyes to particular locations and angular positions within a 3D virtual environment, place and orient render cameras at the particular locations and angular positions within the 3D virtual environment, and render virtual content for the user as it would be captured by the render camera. Further details discussing real world to virtual world mapping processes are provided in U.S. patent application Ser. No. 15/296,869, entitled "SELECTING VIR- TUAL OBJECTS IN A THREE-DIMENSIONAL SPACE," which is expressly incorporated herein by reference in its entirety for all purposes. As an example, the render controller 618 may adjust the depths at which images are displayed by selecting which depth plane (or depth planes) are utilized at any given time to display the images. In some implementations, such a depth plane switch may be carried out through an adjustment of one or more intrinsic render camera parameters.

The iris module 620 may use information from eye tracking module 614 to generate iris codes, for example as described below. For example, the iris module 620 may include an image processor, an iris code generator, an iris code analyzer, a database, an access control module, and any other suitable components, such as described below.

Iris Recognition

Iris recognition systems are used in a variety of environments: for example, building/room access control systems, banking identification verification, and airport screening programs that identify specific persons from a database of a population. An iris recognition system may attempt to compare acquired image data from one or more acquired images of an iris—for example, an iris code from an iris image acquired from a user's eye with a camera—against a set (for example, in a database) of data from one or more iris images. If the acquired image data is found in the set (a "match"), the iris recognition system may indicate that the user is in the set, and may identify and/or authenticate the user. If the acquired image data is not found in the set (a "non-match"), the iris recognition system may indicate that the user is not in the set and may not authenticate the user. The systems and methods described herein may be used with various iris recognition systems, including those incorporating user-wearable devices. Such user-wearable devices may include head-mounted display devices, which may include an imaging device configured to acquire image data from an iris of the user.

Iris recognition may be more tolerant and robust than other biometric systems, such as those designed to recognize human fingerprints, voices, or faces. For example, iris recognition systems may accommodate significant variations in image size (including pupil size), position, and orientation. Iris recognition systems may also exhibit a high sensitivity, even where the input data, such as iris images, are acquired under very different conditions and may appear quite different.

Iris recognition systems may be particularly desirable for use in connection with head-mounted display devices, such as described above. A goal of such devices is frequently to achieve a sense of immersion in a virtual environment, for example as presented on a display of the device. Feelings of immersion can be enhanced by the use of iris scanning to replace or augment input devices such as mice and keyboards, which may psychologically draw the user out of the virtual environment. Providing iris input via iris recognition systems may be perceived as more natural or intuitive than using conventional input devices. Further, in applications (e.g., virtual reality) where the user's view of his or her real environment is obscured, use of such input devices may be difficult, because the user's ability to see the device may be compromised. Unlike a mouse or keyboard, for example, a camera fixed relative to a head-mounted device (and, by extension, to the user's eye) can obtain user input (e.g., by scanning the user's eye) with little or no action required by the user; while the user's view of the real environment is obstructed; and/or while the user's hands are occupied with other tasks. As one example application, using iris recognition to authenticate a user of a virtual reality device that presents a virtual environment can maintain or preserve the user's sense of immersion in the virtual environment by avoiding potentially cumbersome authentication procedures, such as entering a password using a keyboard. Similarly, iris recognition can be used in head-mounted devices to provide input to payment systems; unlock or enable secure systems or features; provide access to personally identifiable information (e.g., medical records); or perform other suitable functions in a comparatively seamless and intuitive manner.

With respect to iris recognition systems, an iris code may be generated from an iris image and used for comparison against iris codes from other iris images. Generally speaking, comparing two iris codes to determine whether they belong to the same iris involves applying a test of statistical independence, where failing the test indicates that the iris codes are a match. In some examples where iris codes have many degrees of freedom, the likelihood of a false match between iris codes of iris images of two different eyes—that is, an incorrect identification that two iris codes of iris images belong to the same user—is very low. The hypothetical odds of a false match may range from 1 in 100,000 to 1 in 100 trillion, for example, depending upon the match parameters used. For example, the odds of a false match may be lower if iris recognition is used to perform verification of a relatively small number of potential users (e.g., against a small iris code database), or higher if iris recognition is used to perform verification of a relatively large number of potential users (e.g., against a large iris code database).

Figure 7:
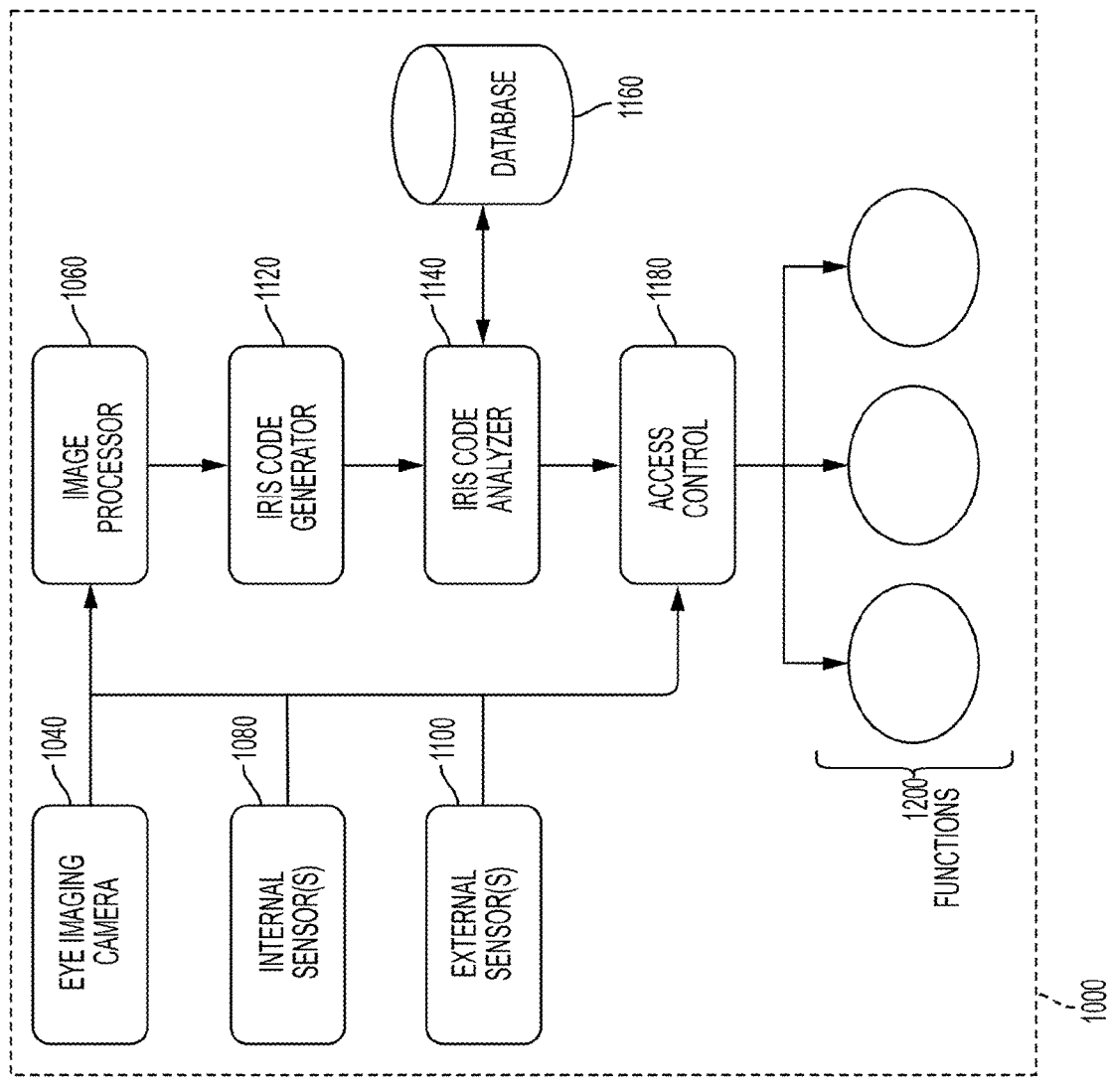
FIG. 7 depicts an example of an iris recognition system.
Figure 7:

FIG. 7 depicts an example of an iris recognition system, according to some embodiments. Example iris recognition system 1000 (hereinafter referred to as "system 1000") is configured to input and analyze one or more of images of an iris 1020 of an eye of a user of the system 1000, and may control access to one or more functions 1200 (hereinafter referred to as "functions 1200"). In some examples, the iris recognition system 1000 may be configured to include an eye imaging camera 1040 (hereinafter referred to as "camera 1040") that may be used to generate an image, such as a digital intensity image, of the iris 1020. In some examples, one or more images generated by the camera 1040 are input to an image processor 1060. In some examples, the image processor 1060 (alone or with additional input from internal sensor(s) 1080 and/or external sensor(s) 1100) manipulates an image so that it may be converted to a numeric iris code by an iris code generator 1120. In some examples, an iris code analyzer 1140 compares the iris code against existing iris codes (which may be stored in a database 1160, such as a relational database) to determine one or more values related to the identity of the user. In some examples, an access controller 1180 uses these one or more values to determine whether and how the user may utilize the functions 1200. In some examples, input from the internal sensor(s) 1080 and/or the external sensor(s) 1100 is used to assist the access controller 1180. In some examples, one or more of these components may be included in iris module 620, described above with respect to FIG. 6.

The camera 1040 outputs image data corresponding to an image of the iris 1020. The camera 1040 may be a general purpose optical camera, or a camera specially configured for imaging a human iris—for example, by possessing the ability to image objects at close focal lengths (for instance, so that the camera 1040 may be mounted in close proximity to the iris 1020 in a head-mounted device) or with sufficient depth of field to obtain a focused image of the entire iris 1020. Although some examples may be configured for close-up eye imaging (for example, less than 12 inches between the camera 1040 and the eye, as in a head-mounted device), other examples may be configured for intermediate or longer distance eye imaging, for example, 2 to 10 feet, or 10 to 30 feet or more. In some examples, the camera 1040 includes a digital image sensor (such as a CCD sensor) and outputs an array of values corresponding to intensities of the light incident on corresponding regions (e.g., pixels) of the image sensor. For example, the image sensor may output an 8-bit grayscale image, in which the intensity of light incident on a pixel is represented as a single value between 0 and 255. In some examples, the image sensor may output a 24-bit color image, in which the intensity of light incident on a pixel is represented as three values between 0 and 255, representing the intensity of red, green, and blue light, respectively. Other eye imaging technologies and representations of image data are possible and may be preferable, depending on specific system requirements.

In examples using the image processor 1060, the image data output by the camera 1040 may be input to the image processor 1060. The image processor 1060 may perform one or more processing operations on the image data, for example to improve the reliability of iris codes generated from that image data, and then output that processed image data, for example to the iris code generator 1120. In some examples, the image processor 1060 may determine the degree to which an iris image is in focus, for instance by using Fourier or wavelet transformations to determine the presence of middle and upper frequencies, which are correlated with focused images. Focus information may be useful to reject low quality images, or to flag iris codes generated from focused images as being potentially more reliable or informative than iris codes generated from unfocused images. For example, a threshold for minimally acceptable focused images may be set, such that images below the threshold may be rejected. In some examples, focus may be adjusted to increase the presence of middle and upper frequencies in an image. In some examples, to achieve greater processing efficiency, image focus may be assessed before any image processing or iris coding operations. In some examples, image focus may be assessed after one or more image processing or iris coding operations.

In some examples, the image processor 1060 may arrange image data in a format that facilities the generation of iris codes. One such format is a pseudopolar format that aligns image data with respect to coordinates in a two-dimensional space including the ring-shaped region of the iris between limbic and pupillary edges of the iris. The image processor 1060 may also perform edge detection operations to identify the limbic and pupillary edges. In some examples, the image processor 1060 may detect regions of image data in which the iris is obscured, such as by an eyelid; and remove this image data, or present it in such a way that it does not interfere with operations on iris data, such as iris code generation.

In some examples, the system 1000 may include one or more internal sensors 1080, which may be directed to the same user as the camera 1040, and/or one or more external sensors 1100 configured to detect information in a local environment and/or a remote environment (e.g. internet or cloud-based sensors). The sensors 1080 and/or 1100 may provide data to assist various features of the system 1000. Example sensors may include accelerometers, external light sensors, internal light sensors (i.e. facing the user), retinal sensors, geolocation/fence sensor systems and the like. In some examples, the sensors 1080 and/or 1100 may be incorporated into a head-mounted display device. In some examples, the sensors 1080 and/or 1100 may be used to make an initial assessment of eye orientation to determine the likelihood of an adequate iris image, or to assist with applying a correction to off-axis images. In some examples, match thresholds for iris recognition may be set using sensor information. For example, a geolocation sensor system may indicate that a user is in a home environment, with iris images generated in consistent lighting conditions, and where relatively low error rates may be expected; or that the user is in an outdoor environment, where iris images may be less consistent and higher error rates may be expected. In some examples, a geolocation sensor system may include a hardware component, such as a "fob," which may be used to detect proximity to the head-mounted display device, or to provide added security, for example by connecting to local networking components.

The internal sensors 1080 and/or the external sensors 1100 may also be helpful to determine when a head-mounted display device has been disengaged by the user. For example, disengagement of a head-mounted display device may be indicated by accelerometer measurements, by light measurements, or by the position of eyewear stems. Light measurements may be based upon reflected light from the user's face or skin and/or based upon the absence of an infrared signal detected by sensors originating from the user. Disengagement may also be determined when the system 1000 is no longer able to successfully image the iris 1020. This determination may occur, for example, after a number of match failures have been detected in a period of time.

In some examples, processed image data output by the image processor 1060 may be used as input to iris code generator 1120. The iris code generator 1120 receives iris data representing one or more iris images, and generates one or more numeric iris codes that correspond to the iris data. In some examples, the iris code generator 1120 divides the iris data into cells, and generates an iris code including one or more values that each correspond to an iris cell. For example, an iris code may represent 1024 cells using 2 bits per cell—which may correspond to the coordinates of a phase vector in the complex plane—for a total of 2048 bits, or 256 bytes. Some examples may use more or fewer cells, and more or less data per cell, resulting in smaller or larger iris codes. For example, an iris code may be in the range of 64 bytes to 1024 bytes or 256 bytes to 4096 bytes. Further, an iris code need not be in multiples of 8 bits or bytes.

In some examples, the iris code generator 1120 may be configured to accumulate one or more iris images and to generate an iris code from the one or more images. Increasing the number of iris images used to generate an iris code may improve the reliability and robustness of the iris code, particularly in environments where iris image data may be unreliable, at the expense of potentially requiring more calculations and processing power.

Iris codes generated by the iris code generator 1120 may be used as input by the iris code analyzer 1140. The iris code analyzer 1140 may compare one or more input iris codes against a set of data, such as a set of iris code-user pairs stored in the database 1160, to determine one or more values related to the identity of the user. In some examples, the iris code analyzer 1140 may compare one or more input iris codes against a stored iris code, such as an iris code in a set of iris code-user pairs, to generate a match value. In some examples, the iris code analyzer 1140 may output an identity of a user that corresponds to an input iris code. In some examples, the iris code analyzer 1140 may output a binary value corresponding to whether a match is found: that is, whether an input iris code corresponds to iris data, such as a stored iris code in a set of iris data, such as in the database 1160. In some examples, the iris code analyzer 1140 outputs one or more values corresponding to statistical data relating to the iris data, such as the statistical confidence that a match does or does not exist for an input iris code. In some examples, the iris code analyzer 1140 may continually update a group of generated iris codes from a user session. For example, generated iris codes may be accumulated in a First-In First-Out (FIFO) buffer configured to store a specified number of generated iris codes. In some examples, the iris code analyzer 1140 may accumulate multiple iris codes, and generate a single iris code (such as a fuzzy iris code) from the multiple iris codes. In some examples, the buffer size may be varied during a user session, depending on the needs of a particular application, or on input from the internal sensors 1080 and/or the external sensors 1100.

In some examples, the iris code analyzer 1140 may periodically reset the iris codes generated during a user session. In some examples, a reset may be performed after a certain number of non-matches has been detected, or after a period of time has elapsed. In some examples, a reset may be triggered by an event. For example, in systems incorporating a head-mounted display device, if the internal sensors 1080 and/or the external sensors 1100 detect a disengagement of the head-mounted display device from the user, or an abrupt change in environment lighting conditions (indicating a possible removal of the head-mounted display device), a reset may be performed.

In some examples, the access controller 1180 uses values output by the iris code analyzer 1140 to provide security or access control to the functions 1200, or other features or functionality of the system 1000. For example, the functions 1200 may include a function that controls door locks in a secured area of a building, such that only certain users are permitted to unlock the doors to the secured area. In accordance with an output value of the iris code analyzer 1140 that identifies a user as a user with permission to unlock the door locks—for example, an output value that is an iris match value that exceeds a threshold value—the access controller 1180 may activate the door unlock functionality, for example, by directing the functions 1200 to unlock the doors. Similarly, in accordance with an output value of the iris code analyzer 1140 that does not identify a user as a user with permission to unlock the door locks, the access controller 1180 may direct the functions 1200 to maintain the doors in a locked state.

Some or all of the elements of the system 1000 shown in FIG. 7 may be implemented using software instructions executed by one or more processors. Such processors may be embodied within a portable or non-portable device, including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a wearable device (including head-mounted devices, which may include a head-mounted display device), or any other system or device adaptable to the inclusion of the system 1000, including combinations of two or more of these types of devices.

It should be apparent that the system 1000 shown in FIG. 7 is only one example architecture of the system 1000, and that the system 1000 may have more or fewer components than shown, or a different configuration of components. The various components shown in FIG. 7 may be implemented in hardware, software, firmware or any combination thereof, including one or more signal processing and/or application specific integrated circuits. Further, where disclosed methods are performed, steps of those methods need not be performed sequentially.

The disclosure is not limited to any particular physical embodiment of the system 1000 shown in FIG. 7. For example, the system 1000 may be implemented in a single physical housing, or in two or more separate housings. In some examples, one or more components may be provided in a wearable computing device, such as a virtual reality (VR) or augmented reality (AR) head-mounted display device, while one or more other components may be tethered in a wired or wireless arrangement to a separate housing or casing, such as for a cell phone, tablet computer, laptop, desktop, watch, clothing, belt pack, backpack, or headband. For instance, one or more of camera 1040 and sensors 1080/1100 may be mounted to a head-mounted display device, such that the camera and/or sensors remain fixed relative to a user's head and eyes (which themselves may be fixed relative to the head-mounted display device).

The system 1000 is not limited to imaging only a single iris 1020. While in some examples the system 1000 may image and process only a single iris of the user, in some examples the system 1000 may be configured to image and process both eyes of a user (which typically exhibit independent iris patterns), or multiple eyes from multiple users.

Image Processing

Usable iris image data corresponds to the region of the eye between the limbic and pupillary edges of the iris that is not obscured by the eyelids. The image processor 1060 may be configured to detect the limbic and pupillary edges of the iris, as well as eyelid boundaries. In some examples, performing this edge detection utilizes a circular edge detector operation, as taught for example in Daugman, How Iris Recognition Works, IEEE Transactions on Circuits and Systems for Video Technology, Vol. 14, No. 1, January 2004, pp. 21-30, as equation (1):

$$\underset{(r,\ x_0,\ y_0)}{\mathrm{argmax}} \left| G_\sigma(r) * \frac{\partial}{\partial r} \oint_{r,x_0,y_0} \frac{I(x,\ y)}{2\pi r} ds \right| \qquad (1)$$

In equation (1), I(x,y) represents the intensity of the iris image data at Cartesian coordinates (x, y), the * symbol represents a convolution operator, r represents a radius, and $G_o(r)$ is a smoothing function. As described in Daugman, for example, the operation described above may be used to detect an iris boundary in an image by iteratively identifying, in an image domain (x, y), a maximum of a blurred partial derivative of a contour integral of I(x,y), along a circular arc ds of radius r and center coordinates $(x_0,y_0)$. After detection of the iris boundary, a measure of interference or image abnormality may be assessed (for example, by calculating an amount of eyelid coverage). In some examples, image data may be rejected (for example by the image processor 1060), and/or a corresponding iris code may be omitted from analysis (for example by the iris code analyzer 1140), if excessive interference or image abnormalities are found.

An initial iris image may be converted or transformed from a Cartesian coordinate system to a pseudopolar coordinate system. In some examples, after identifying the limbic and pupillary edges of the iris 1020, as well as any overlap by eyelashes and eyelids, the resulting annular iris image is "unwrapped" using a rectangular rubber sheet model and/or converted from a Cartesian (e.g., x, y) coordinate system to a polar (e.g., r, θ) coordinate system. For example, this may be performed in part by converting iris image I(x,y) to a dimensionless non-concentric polar coordinate system (r,θ), in which r ranges from a pupillary boundary to a limbus as a unit interval [0,1], for instance as described in Daugman as equation (2):

$$I(x(r,\theta),y(r,\theta)) \rightarrow I(r,\theta)$$

$$x(r,\theta)=(1-r)x_p(\theta)+rx_s(\theta) \quad (2)$$

$$y(r,\theta)=(1-r)y_p(\theta)+ry_s(\theta)$$

In equation (2), $x_p$ and $y_p$ are pupil boundary points defining an inner iris boundary, and $x_s$ and $y_s$ are scleral boundary points defining an outer iris boundary. These boundaries may be detected by maximizing the x(r,θ) and y(r,θ) equations.

Iris Code Generation

The disclosure is not limited to a particular manner of generating an iris code from image data. In some examples, an iris code may be represented by dividing image data into multiple regions, or cells, and using two bits to encode a vector in a complex plane, corresponding to phase information, for each cell. Generating iris codes from phase information, rather than image intensity, may be advantageous in that phase information is generally preserved even in fuzzy or low resolution images, such that phase information may be reliably recovered even in poor imaging conditions. Phase information may be extracted from iris images. For example, 2D Gabor wavelets, as described in Daugman, may be used to phase-demodulate iris patterns and generate complex value coefficients with real and imaginary components, such as in equation (3):

$$h_{\{Re,Im\}} = \mathrm{sgn}_{\{Re,Im\}} \int_\rho \int_\phi I(\rho,\phi) e^{-j\omega(\theta_0-\phi)} e^{-(r_0-\rho)^2/\alpha^2} e^{-(\theta_0-\phi)^2/\beta^2} \rho\, d\rho\, d\phi \quad (3)$$

In equation (3), $h_{\{Re,Im\}}$ is a phasor whose real and imaginary parts are either 1 or 0 based upon a sign of the 2D integral, I(ρ,ϕ) is the intensity of an iris image in pseudopolar coordinates (after normalization using a rubber sheet model), α and β are wavelet parameters, ω is a wavelet frequency inversely proportional to β, and ($r_0, \theta_0$) are the polar coordinates for a cell of the iris. The complex value for a cell may be quantized into one of four quadrants in the complex plane (e.g., [0,1], [1,1], [1,0] and [0,0]), each represented by 2 bits. Variations in angular orientation of the iris image data may be addressed by cyclic scrolling of the angular component of the polar coordinate system to seek the best match. Alternatively, the underlying image data may be rotationally matched, for example using an Euler matrix or another transformation, before an iris code is generated.

In some examples, cell values from one or more iris images may fail to meet assignment requirements or other determinations of cell stability or variability. A mask or map of such cells (similar to the iris code itself) may be generated. For example, some complex values projected from 2D Gabor wavelet transformations may lie near one or both axes of a complex plane, and sample variations may cause these values to be inconsistently or incorrectly quantized. Omitting these inconsistent bits or cell values from the iris code analysis may improve iris recognition accuracy. In some examples, a bitwise map, representing a mask, may be applied to an iris code to identify bits or cell values that should be disregarded, for example by an iris code analyzer (e.g., the iris code analyzer 1140). This bitwise map may be used to mask or exclude variable or inconsistent cells of the iris code when determining the match between a stored iris code and a generated iris code. In some examples, the map may include both consistent and inconsistent cells of the iris code, corresponding to iris regions of the iris images, but exclude eyelid, eyelash, and/or specular light effects.

In some examples, a second set of complex values may be projected from a second set of 2D Gabor wavelet transforms, having different orientations than a first set of 2D Gabor wavelet transforms. The second set of complex values may have a different pattern of inconsistent bits, or otherwise be quantized into a coordinate system that is rotated 45 degrees with respect to the coordinate system of the first set of 2D Gabor wavelet transforms. Inconsistent bits from the first set of 2D Gabor wavelet transforms may then be substituted with the cell values generated from the second set of 2D Gabor wavelet transforms, which may be more consistent and therefore improve the accuracy of match verification. In some examples, complex values for each cell of the iris image may be directly averaged and/or compared with complex values generated from the stored iris images, to reduce or avoid inconsistencies that may result from quantization.

In some examples, one or more iris images may be acquired and used to generate a composite iris code. For each cell of the composite iris code, a final value may be assigned to that cell. In some examples, a "voting scheme" (e.g., simple majority) may be used to compute a final value. In some examples, each value may be statistically compared to each grouping of the other categorical values to determine whether a dominant value exists for that cell from the one or more iris images. In some examples, a distribution metric, such as a probability distribution (with or without a measure of confidence in that distribution) may be used to determine the likelihood of a match between iris codes.

Iris Code Analysis and Matching

The iris code analyzer 1140 may compare a generated iris code (such as a composite iris code) against a stored iris code (in some examples stored in the database 1160) to determine whether the generated iris code is a match for the stored iris code. The disclosure is not limited to a particular mechanism for determining whether a match exists. In some examples, whether a match exists is determined using the result of a test of whether two iris codes are statistically independent: if the test fails, such that the generated iris code is not statistically independent of the stored iris code, then the generated iris code may be considered a match for the stored iris code.

In some embodiments, it may be desirable to maximize the accuracy of the iris code analysis. For example, it is desirable to reduce both a false acceptance rate (FAR), or type II error, which is the likelihood that a non-match is incorrectly identified as a match, and also a false rejection rate (FRR), or type I error, which is the likelihood that a match is incorrectly identified as a non-match. These error rates may depend on threshold values used to classify matches and non-matches. A measure that may be used to compare the accuracy of different iris recognition systems and algorithms is an equal error rate (EER), or the error rate at the threshold where the rate of false rejections of matching image pairs equals the rate of false acceptances of unmatched image pairs. Generally speaking, a system with a lower EER may achieve more accurate results than a system with a higher EER.

Improved accuracy in iris recognition systems may be achieved in a number of ways. For example, better system components may allow higher resolution images, better focusing mechanisms, and/or improved methods of shielding the imaging area from unwanted light in the environment. This may enable higher quality, more reproducible iris images from which iris codes may be more accurately and reliably generated. Accuracy may also be improved by discarding low-quality images. For example, an iris image may be assigned a quality score relating to that image's usefulness in iris recognition. As an example, an image that is out-of-focus, that has excessive specular components, that has excessive eyelid coverage, or that was taken at an extreme angle, may be assigned a low quality score, because those factors limit its usefulness for iris recognition. The system may compare an image's quality score to a threshold, and discard an image if its quality score does not meet the threshold. In some examples, the system may acquire additional images until an adequate or higher-quality image is obtained. In some examples, the system may provide user instructions or user cues, such as flashing lights, to facilitate the desired eye orientation for image acquisition.

Various methods may be used to quantify the difference between two iris codes in an iris recognition system, and the method or methods used may inform or affect the EER of the system. One such metric for quantifying this difference is a Hamming Distance (HD). The Hamming Distance between codeA and codeB, to which maskA and maskB (identifying iris code bits to be excluded from the Hamming Distance calculation) are applied respectively, may be defined as equation (4):

$$HD = \frac{\|(codeA \otimes codeB) I maskA I maskB\|}{\|maskA I maskB\|} \quad (4)$$

In equation (4), the Boolean Exclusive-OR operator ($\otimes$) outputs a bitwise difference between two iris codes (e.g., codeA and codeB). The bitwise values maskA and maskB may use a value of zero to represent iris code regions corresponding to eyelids, eyelashes, lighting aberrations, or other obstacles to iris recognition that should be excluded from the Hamming Distance calculation, for example by performing a bitwise AND operation between maskA, maskB, and the output of the Exclusive-OR operation, and then normalizing the result by the total number of unmasked bits (i.e., $\|maskA I maskB\|$).

The resulting Hamming Distance (HD) provides a measure of the bitwise similarity between two iris codes. A smaller Hamming Distance corresponds to greater similarity between the two iris codes. In some examples, a Hamming Distance between two iris codes is compared to a threshold value to determine whether a match exists. For example, a Hamming Distance between two iris codes that falls below the threshold may indicate that the two iris codes match. A lower threshold may result in fewer matches identified, but at the risk of generating more false rejections. Similarly, a higher threshold may result in more matches identified, but at the risk of generating more false acceptances. In some examples, a threshold may be set in a range of about 0.25 to about 0.36, depending on considerations such as the reliability and consistency of the image data from which iris codes are generated. In some examples, multiple thresholds may be employed.

In some examples, masks of the stored and generated iris codes (e.g., maskA and maskB corresponding to iris codes codeA and codeB) may also be compared, for example using the same calculations used to generate the iris codes themselves, and the results may be used to further improve the accuracy of a determination of a match between the two iris codes. For each iris code, a map may be generated that conveys reliability of each bit/feature. For example, similarity between two maps (corresponding to, for example, eyelid regions) generated for two iris codes may be indicative that the iris codes belong to the same iris, and thus that a match exists between the two iris codes. Similarly, a first map of variable or inconsistent cells in a first iris code may be compared with a second map of variable or inconsistent cells from one or more iris codes. Similarity between the first map and the second map may be indicative that the first iris code corresponds to the same iris as does the one or more iris codes.

Referring to FIG. 7, in some examples, the iris code analyzer 1140 may analyze and quantify variations in cells of an iris code, and utilize variability or probability information to improve the accuracy of iris matching calculations. In some examples, cells that exhibit relatively higher variability, and that may thus convey less useful information, may be excluded from match detection. In some examples, information (such as statistical information) corresponding to cell variations may be used to more accurately assign quantized values to the variable cells. In some examples, partial match values or other weighted values may be assigned to the variable cells for match detection.

Iris codes may be represented using probabilistic values by the iris code analyzer 1140. This may improve iris recognition accuracy, particularly in systems using small sample sizes or in which iris codes or image data exhibit high variability. For example, in examples where iris codes include one or more cells expressed as a single-bit outcome (e.g., 1 and 0, corresponding to a positive or negative value of a convolution of a filter with a region of the iris image), each such bit may be characterized as a probability or weighted value based upon a sample size. This is analogous to a weighted coin that generates a value of heads with some probability and a value of tails with probability (1−x). An estimate of x, including information about the statistical quality of that estimate, may be used in order to compute the quality of a match between two iris codes. For example, for each bit in an iris code, probability may be estimated using a prior distribution of possible outcomes for the weight of that bit. A prior probability distribution over possible weights may be modeled using a Beta distribution, and the state of prior knowledge may be modeled using shape parameters a and h. One example Beta distribution may be expressed as equation (5):

$$\text{Beta}(x; a, b) = \frac{\Gamma(a+b)}{\Gamma(a)\Gamma(b)} x^{a-1} (1-x)^{b-1} \quad (5)$$

In equation (5), example values for the shape parameters a and b may include 0.01 and 0.1, respectively. $\Gamma$ is the gamma function (i.e., $\Gamma(n)=(n-1)!$).

After a number n+m of observations of the bit, in which the bit is observed to have the value of 1 n times and the value of 0 m times, the probability distribution of possible weights may be expressed as Beta(x; a+n, b+m). This model, the expectation E[x] and the variance var[x] of the model distribution for x may be expressed as equations (6), (7), and (8), respectively:

$$\text{Beta}(x; a+n, b+m) \quad (6)$$

$$E[x] = \frac{a+n}{a+b+n+m} \quad (7)$$

$$\text{var}[x] = \frac{(a+n)(b+m)}{(a+b+n+m)^2(a+b+n+m+1)} \quad (8)$$

Thus, the expectation and variance may be expressed for the weight of each bit in an iris which has been observed n+m times. The iris code analyzer 1140 may use this statistical information to quantify the degree of confidence in an iris code operation. In some embodiments, it may be sufficient for the iris code analyzer 1140 to store either the expectation E[x] and the variance var[x] or (a+n) and (b+m) for each bit in the iris code, rather than all of the raw sample bit information. Thus, in some examples, iris codes including 2048 single bit entries may be replaced in the iris code analyzer 1140 by 2048 pairs of real numbers representing the expectation and the variance. This may be referred to as a "Fuzzy Iris Code" (FIC).

The iris code analyzer 1140 may use various difference metrics to quantify the difference between two fuzzy iris codes. Such metrics may be characterized by a form of "distance" measurement analogous to the Hamming Distance described previously. In some examples, difference metrics may be normalized with respect to the number of bits in the iris code.

One example difference metric is a "Soft Hamming Distance" (SHD). Defining the expectation value of bit i from fuzzy code j as $E[x_i^{(j)}]$, the SHD may be expressed in the iris code analyzer 1140 as the sum of the absolute differences of the expectation values across all bits, such as in equation (9):

$$FHD \equiv \frac{1}{N} \sum_{bits,i} \text{abs}(E[x_i^{(1)}] - E[x_i^{(2)}]) \qquad (9)$$

Another example difference metric is a "Median Hamming Distance" (MHD). Defining the median value (here, the most probable value of zeros and ones) of bit i from fuzzy code j as $med[x_i^{(j)}]$, the MHD may be expressed in the iris code analyzer 1140 as the sum of the absolute differences of the median values across all bits, such as in equation (10):

$$MHD \equiv \frac{1}{N} \sum_{bits,i} \text{abs}(med[x_i^{(1)}] - med[x_i^{(2)}]) \qquad (10)$$

Another example difference metric is the "Fuzzy Z-Score" (FZS). The variance of the distribution about the weight of bit i from fuzzy code j may be defined as $var[x_i^{(j)}]$. The FZS may then be expressed in the iris code analyzer 1140 as the sum of the absolute differences of the expectation values across all bits, with each such difference scaled by the sum of the associated variances, such as in equation (11):

$$FZS \equiv \frac{1}{N} \sum_{bits,i} \frac{\text{abs}(E[x_i^{(1)}] - E[x_i^{(2)}])}{\sqrt{\frac{var[x_i^{(1)}] + var[x_i^{(2)}]}{2}}} \qquad (11)$$

Using one or more of these example difference metrics, the iris code analyzer 1140 may compare two fuzzy iris codes to determine whether there is a match to the same iris, based, for example, on some pre-determined threshold value.

Some difference metrics may be described as treating groups of z bits as random processes having an underlying weight, such that the probabilities of the $K=2^z$ possible outcomes are specified by a multinomial distribution. In some embodiments, a mapping may be applied to the possible outcomes to group the possible outcomes. The mapping may be determined/applied using supervised or unsupervised machine learning, clustering, or constructed analytically. For example, bit pairs corresponding to convolutions of two different filters at the same location on the iris would constitute a group with z=2 and thus $K=2^z=4$ possible outcomes. (However, the bits in a group may or may not correspond to the same location on the iris image, as they may be the result of filters applied at the same, neighboring, or totally different areas of the iris.) This may be expressed as a categorical distribution, with a vector of probabilities $\vec{k}$, having one element for each of K categories (i.e. possible result for a bit group). The values of $x_k$ may be normalized such that their sum equals one. Weights may be characterized by a Dirichlet distribution Dir($\vec{k}$,K) with K shape parameters (or "concentration parameters"), analogous to the parameters a and b described above with respect to the Beta distribution in the binomial case. The shape parameters may begin with a value which encodes the prior information of the bit groups, and may be updated as individual measurements are made about the corresponding group in different iris images.

In some examples, the iris code analyzer 1140 may use a "Fuzzy Multinomial Iris Code" (FMIC) instead of a FIC. For a group size z, a FMIC may have 2048/z entries, each represented by $K=2^z$ real shape parameters. The example difference metrics defined above for the binomial case may be generalized to the multinomial case, as shown below. In some examples, indicator vectors $\vec{v}$ may be a set of K dimensional vectors, in which all elements are set to zero except an element which corresponds to a highest probability in a weight vector for a particular group, which is set to one. Vector $\vec{v}_i^j$ may be defined as an indicator vector corresponding to an i-th bit group in a j-th FMIC. $\vec{k}$ may be defined as an expected value of a K-dimensional weight vector for an i-th group (i.e., the best estimate of the weight for that group), and may be expressed as equation (12):

$$\vec{k}_i = \left(\frac{\alpha_1}{\alpha_0}, \frac{\alpha_2}{\alpha_0}, \ldots, \frac{\alpha_K}{\alpha_0}\right), E[x_k]_i = \frac{\alpha_k}{\alpha_0} \qquad (12)$$

$$\alpha_0 = \sum_{k=1}^{K} \alpha_k \qquad (13)$$

Equation (13) may represent a sum of shape parameters for a particular group. Defining $\mu_i = E(X_i)$, a covariance matrix $\Sigma$ may be expressed as equation (14):

$$\Sigma = \begin{bmatrix} E[(X_1-\mu_1)(X_1-\mu_1)] & E[(X_1-\mu_1)(X_2-\mu_2)] & \wedge & E[(X_1-\mu_1)(X_n-\mu_n)] \\ E[(X_2-\mu_2)(X_1-\mu_1)] & E[(X_2-\mu_2)(X_2-\mu_2)] & \wedge & E[(X_2-\mu_2)(X_n-\mu_n)] \\ M & M & O & M \\ E[(X_n-\mu_n)(X_1-\mu_1)] & E[(X_n-\mu_n)(X_2-\mu_2)] & \wedge & E[(X_n-\mu_n)(X_n-\mu_n)] \end{bmatrix} \qquad (14)$$

Defining N to mean the number of bit groups (rather than the number of bits), multinomial versions of the example difference metrics may be expressed as equations (15), (16), and/or (17):

$$FHD \equiv \frac{1}{N} \sum_{bits,i} \sqrt{(\underline{E}_i^{(1)} - \underline{E}_i^{(2)})^T (\underline{E}_i^{(1)} - \underline{E}_i^{(2)})} \quad (15)$$

$$MHD \equiv \frac{1}{N} \sum_{bits,i} \sqrt{(\underline{P}_i^{(1)} - \underline{P}_i^{(2)})^T (\underline{P}_i^{(1)} - \underline{P}_i^{(2)})} \quad (16)$$

$$FZS \equiv \frac{1}{N} \sum_{bits,i} \sqrt{(\underline{E}_i^{(1)} - \underline{E}_i^{(2)})^T \Sigma^{-1} (\underline{E}_i^{(1)} - \underline{E}_i^{(2)})} \quad (17)$$

In some examples, the example difference metrics above may be evaluated with a minimum variance $\epsilon$. In these examples, the variances used in calculation may be an observed variance plus the minimum variance $\epsilon$, or the greater of the observed variance and the minimum variance $\epsilon$. The minimum variance $\epsilon$ may be added to better condition the difference metrics. This may be done to compensate for a lack of data.

Figure 8:
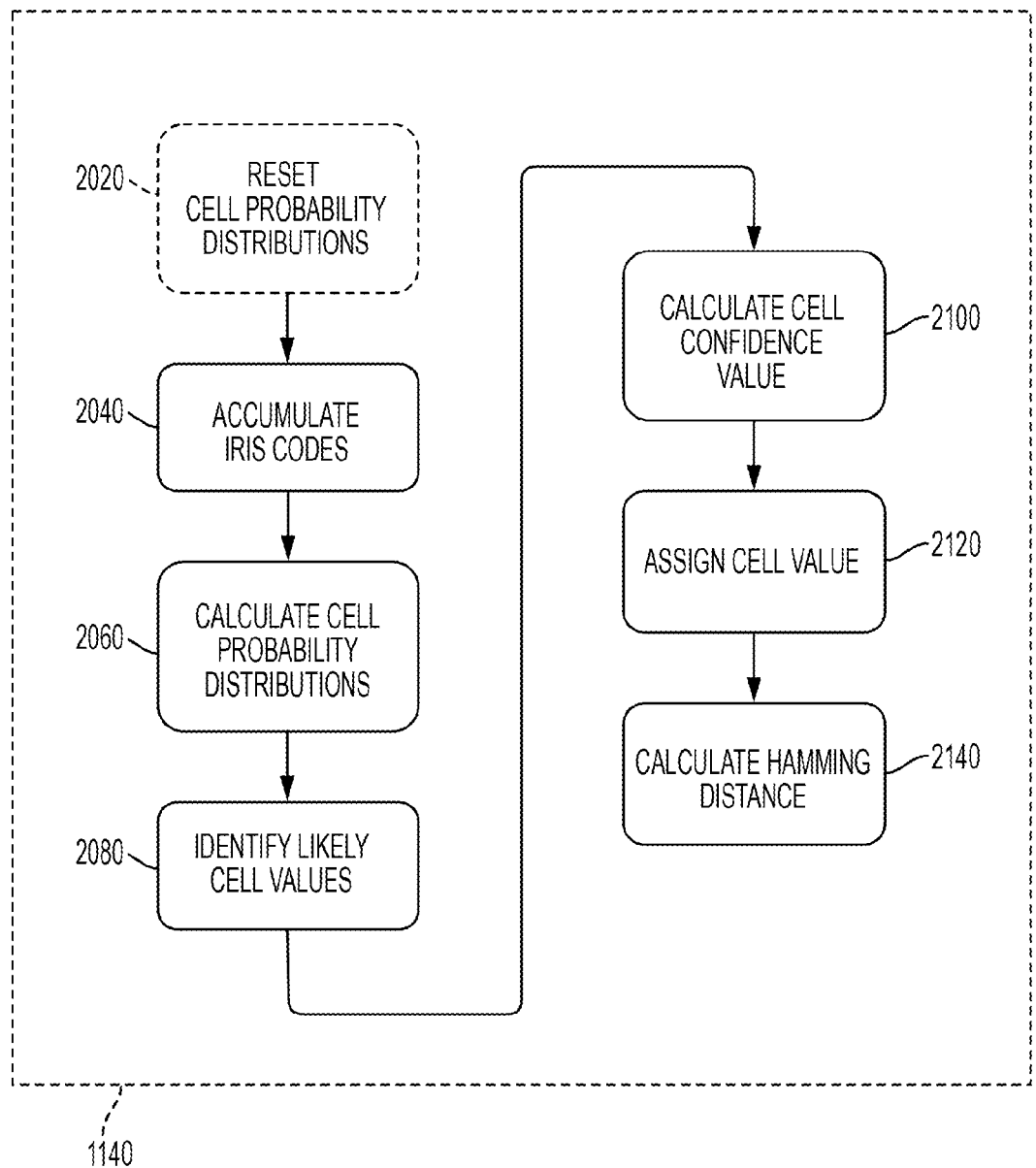
FIG. 8 depicts an example process for comparing iris codes.

FIG. 8 depicts an example process for comparing iris codes, according to some embodiments. In FIG. 8, an iris code analyzer 1140 is shown executing a process to compare two iris codes. The iris code analyzer 1140 may be configured to reset (2020) cell probability distributions, accumulate (2040) a number of iris codes from a current user session, and calculate (2060) cell probability distributions for one or more cells. The values of one or more cells may be identified or determined (2080), and a size-dependent confidence value may be calculated (2100) for one or more cells. In some examples, values are not calculated for cells that do not meet certain variability criteria. In some examples, based upon a statistical comparison, such as comparing a confidence interval/value of a generated iris code to a confidence interval/value of a stored iris code, a cell may be assigned (2120) a value, or omitted, before calculating (2140) a Hamming Distance between a generated iris code and a stored iris code. In some examples, the iris code analyzer 1140 may use the SHD, MHD, and/or FZS metrics, or another fuzzy metric to compare two (fuzzy) iris codes.

In some examples, the iris code analyzer 1140 may be configured to compare a single generated iris code to a stored iris code, or to generate a composite iris code based upon two or more generated iris codes. In some examples, the iris code analyzer 1140 may require a minimum number or predetermined number (e.g., 2, 50, 1000, 3000) of iris images or iris codes to generate a composite iris code.

Figure 9:
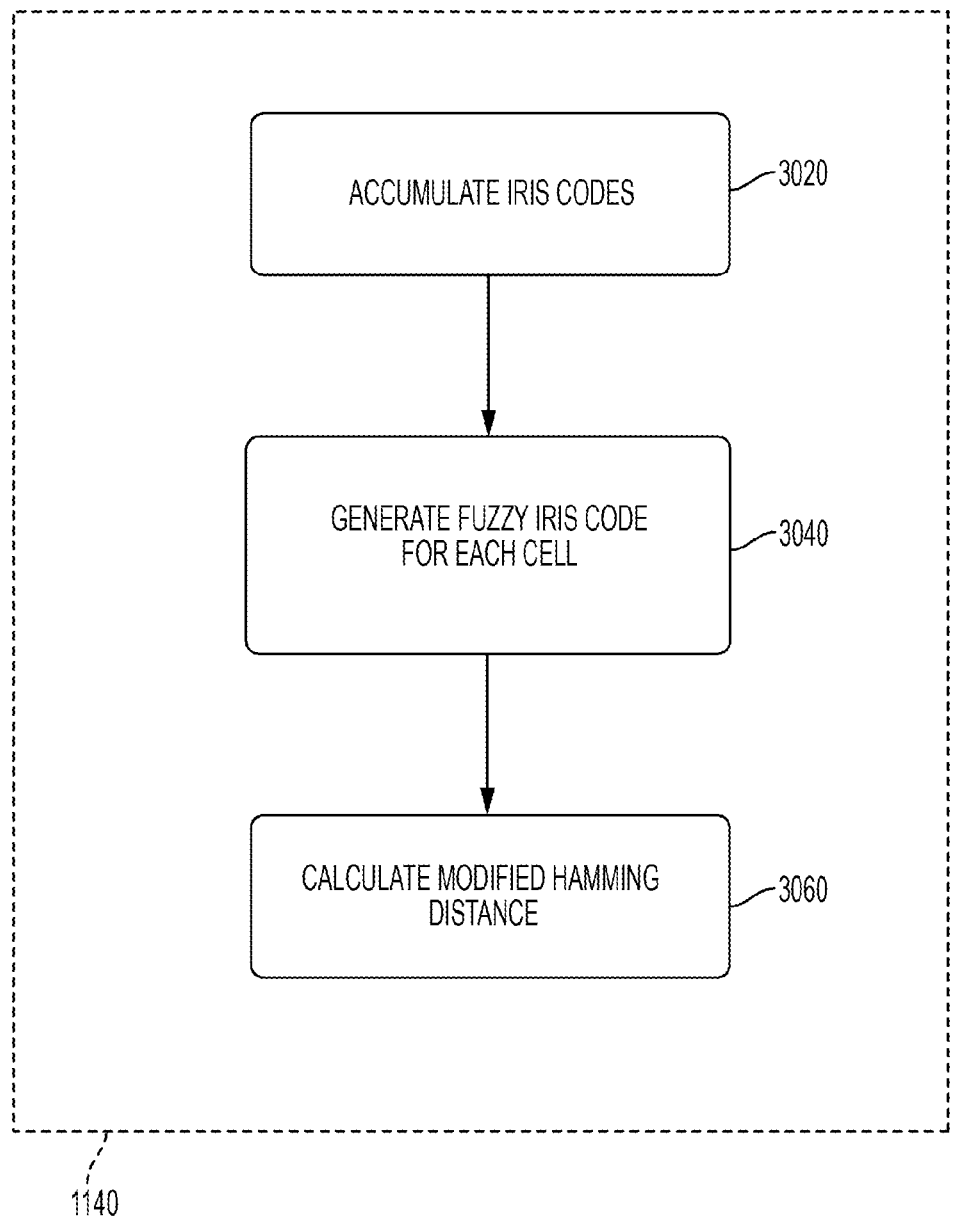
FIG. 9 depicts an example process for accumulating and comparing iris codes.

FIG. 9 depicts an example process for accumulating and comparing iris codes, according to some embodiments. In FIG. 9, an iris code analyzer 1140 may be configured to accumulate (3020) a number of generated iris codes, and then generate (3040) a fuzzy iris code for each cell. In some examples, a non-binary value ranging from 0 to 1, corresponding to an average of a bit (or the probability of a binary bit value of 1) across the set of iris codes, may be calculated. A confidence of each non-binary value may be reliably reproducible in examples with sufficiently large sample sizes. For example, in a non-binary composite iris code where a probability of a 0 or 1 outcome is equal (e.g., an average bit value is 0.5), an inconsistent bit may be reproducible (i.e., a probability may be fairly reliable and may behave as a stochastic Bernoulli variable). In some examples, rather than omitting the corresponding bit or cell values from a Hamming Distance calculation, a modified Hamming Distance calculation (3060) may be performed, using average non-binary bit values. A non-binary composite iris code may be used to match against another non-binary composite iris code, or a binary composite iris code where binary values of each bit are treated as continuous values in the range of 0 to 1. This may improve a separation between Hamming Distance distributions for matches and non-matches, in turn lowering the effective EER.

Figure 10A:
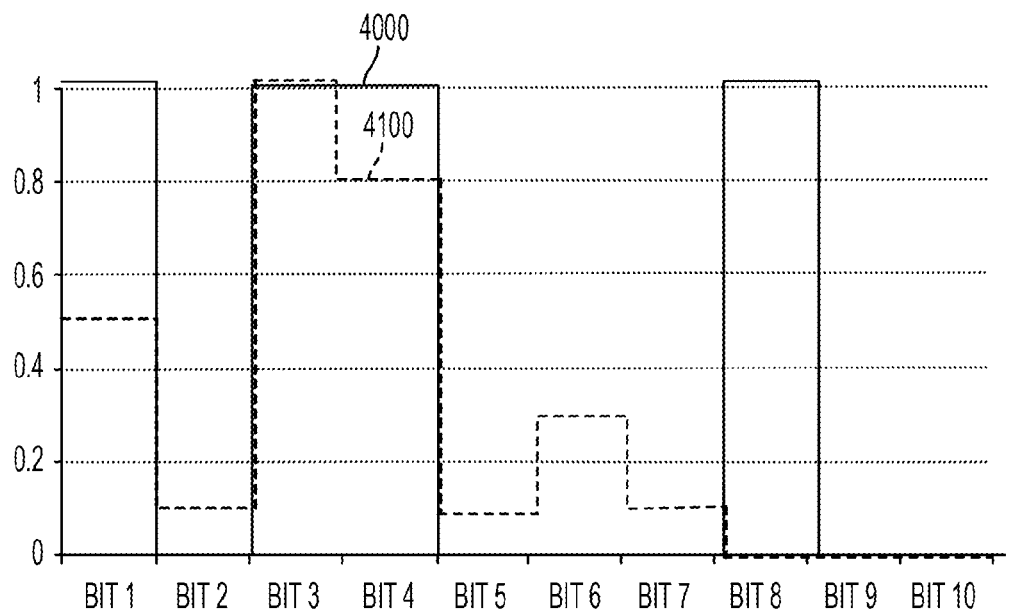
FIG. 10A depicts an example binary iris code and an example fuzzy iris code.

FIG. 10A depicts an example binary iris code and an example fuzzy iris code, according to some embodiments. An example 10-bit portion of a stored binary iris code with value 1011000100 is shown as line 4000. Line 4100 shows a fuzzy iris code, representing the probability of a "1" value for each corresponding bit value in one or more generated iris codes. Some bits may be characterized as inconsistent based on their corresponding probability values. For example, a probability value in the range of 0.40 to 0.60, such as for bit 1 in FIG. 10A, may be characterized as inconclusive. The remaining bits of the generated set of iris codes would then be quantized to either a 0 or 1 value, so that the bit portion has a value of X011000000 (where 'X' represents an inconsistent bit), indicating a mismatch at bit 8, where the binary iris code has a value of 1, and the fuzzy iris code has a value of 0. If the inconsistent bit is treated as a mismatched bit, the Hamming Distance for the two iris code portions may be computed as 2/10, or 0.2, due to mismatches at bits 1 and 8. In some examples, if bit 1 is omitted from the Hamming Distance calculation, the result would be 1/10, or 0.1. In some examples, if bit 1 is omitted from the Hamming Distance calculation, the result would be 1/9. In some examples, if bit 1 is treated as a having a value of 0.5, then the difference in bit 1 would be |1−0.5|, or 0.5, resulting in a Hamming Distance of 1.5/10, or 0.15.

In examples where the iris code analyzer 1140 is configured to characterize any probability value from 0.2 to 0.8 as inconsistent, then the exemplary generated set of iris codes would have a value of X01X0X0000, reflecting three inconsistent bits (bits 1, 4, and 6), and a mismatch at bit 8. In some examples, if the three inconsistent bits are characterized as mismatches, then the Hamming distance would be 4/10, or 0.4000. In some examples, if the inconsistent bits 1, 4 and 6 are assigned their probability values of 0.5, 0.8, and 0.3, respectively, then the corresponding differential values of |1−0.5|, |1−0.8|, and |0−0.3| would be used to calculate the Hamming Distance, (0.5+0.2+0.3+1)/10=0.20.

Figure 10B:
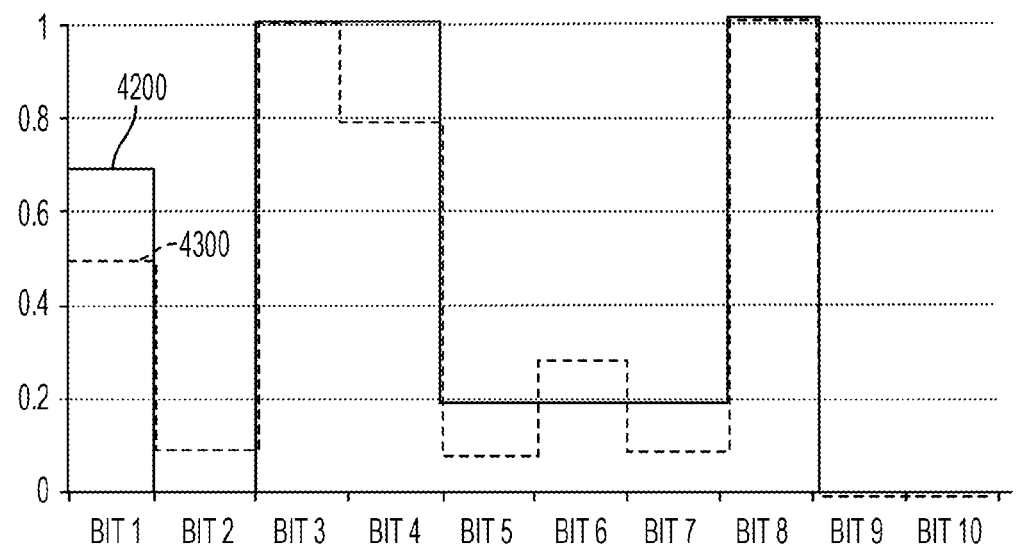
FIG. 10B depicts two example fuzzy iris codes.

While the examples described for FIG. 10A involve a match comparison between a fuzzy composite iris code and a binary iris code, some examples may involve a match comparison between two fuzzy iris codes. FIG. 10B depicts two example fuzzy iris codes. FIG. 10B, shows, as 4200, the value of a stored fuzzy iris code: 0.7/0.0/1.0/1.0/0.2/0.2/0.2/1.0/0.0/0.0. FIG. 10B also shows, as 4300, the value of a generated fuzzy iris code: 0.5/0.1/1.0/0.8/0.1/0.3/0.1/1.0/0.0/0.0. The modified Hamming Distance when comparing these two non-binary composite iris codes is (0.2+0.1+0.0+0.2+0.1+0.1+0.1+1.0+0.0+0.0)/10.0, or 0.18.

In some examples, more than one stored iris code may be associated with a user. These stored iris codes may be associated with user conditions, environmental conditions, states detectable by internal and/or external sensors, or other criteria. For example, a stored iris code may be associated with certain light conditions detected by internal and/or external sensors, or with certain eye orientations identified (such as by gaze tracking) by internal sensors. In some examples, to reduce the risk of false positive matches from a larger number of stored sets of iris codes, the iris code analyzer 1140 may be configured to only utilize additional iris codes under certain conditions: for example, if sensor inputs satisfy certain input parameters. In some examples, the iris code analyzer 1140 may be configured to utilize different Hamming Distance thresholds for different iris codes. For instance, the iris code analyzer 1140 may use a first Hamming Distance threshold to verify a match using a first iris code; and a second, lower (and thus stricter), Hamming Distance threshold to verify a match using a second iris code.

Systems incorporating a head-mounted display device may provide opportunities for refining iris code comparisons. For example, unlike systems which acquire an initial iris image using an imaging device not coupled to a user, user-wearable systems may remain engaged with a user after an initial user identification, permitting ongoing iris image acquisition even after an initial user match has been confirmed. Post-match images may be used to reconfirm a user's identity, to further refine a stored iris code used for future user identification, and/or to improve statistical confidence in a match.

In some examples, an iris recognition system, whether in a head-mounted or non-head-mounted system, may collect and/or calculate other data relating to the match process itself. For example, this may include the distribution of positive matches (e.g. the Hamming Distance achieved at initial match verification and/or re-verification during a session), or the average Hamming Distance achieved (with or without a confidence or variance measure). This data may be used, for example, to calibrate an access controller. For example, some users may be able to consistently achieve a lower Hamming Distance than other users, and the thresholds set by the system may be adjusted accordingly to achieve the desired security and/or user experience. In some examples, the system may also collect or process data from other sensor systems, which may or may not be correlated with matches or non-matches. In some examples, a user or an account may be associated with multiple iris codes for the same user. In some examples, a match to any of the iris codes may be sufficient for achieving a match, and in some examples, one or more of the iris codes may be secondary iris codes where a match is only permitted if other sensor criteria are met.

In some examples, a match may be re-verified periodically, which may enhance security by confirming the matched user's continued presence. Re-verification may take place, for example, every second, every ten seconds, every minute, or every hour. In some examples, the rate of reassessment may vary depending upon the user function being used or requested. For example, when performing a gaming function, re-verification may not be required, or may start upon the end of a gaming session; but accessing sensitive financial or health information may require periodic re-verification during the access period. In some examples, the access controller 1180 may be configured to permit the user to temporarily or conditionally suspend re-verification—for example, if the user wishes to permits another user (with different irises) to use the system. In some examples, the user's ability to suspend reverification may be selectively blocked with respect to certain user functions or data, such as sensitive financial or health information, or content tagged as confidential.

In some examples, different levels of security access may be associated with different levels of account access or functionality. For example, lower levels of security access may enable faster iris verification under suboptimal image acquisition conditions, and may be sufficient for basic user functionality; while higher levels of security, corresponding to a higher level of confidence in a user's identity, may be granted only after acquiring and analyzing multiple iris images. Referring to FIG. 7, in some embodiments, the system 1000 may be configured so that the iris verification provides not only a match value corresponding to either a non-match or a complete match, but also a value corresponding to a conditional or partial match. In some examples, a first functionality of the system 1000 (such as one or more of functions 1200) may be activated in response to a complete match, while a second functionality of the system 1000 may be activated in response to a conditional match. The second functionality may be a subset of the first functionality, may be more limited than the first functionality, or may otherwise not be identical to the first functionality. In some examples, one or more of the functions 1200 may be usable with little or no iris verification, while other functions 1200 may require a higher level of confidence in a user's identity. In some examples, less sensitive applications, such as gaming, may permit higher Hamming Distance thresholds; while more sensitive applications, such as access to financial or health information, may require lower or stricter Hamming Distance thresholds. In some examples, in response to determining that a match value corresponds to a conditional match, the system 1000 may obtain additional iris images, generate additional iris codes, generate a composite iris code, and generate a new match value corresponding to a complete match or a non-match.

The above example processes may be implemented in a computer system using any suitable logic circuitry. Suitable logic circuitry may include one or more computer processors (e.g., CPU, GPU, etc.) that, when executing instructions implemented in a software program, perform the processes. Additionally, such processes may also be provided via corresponding logic design implemented in hardware logic circuitry, such as programmable logic (e.g., PLD, FPGA, etc.) or customized logic (e.g., ASIC, etc.) implementing logic designs that provide the processes. Furthermore, such processes may be provided via an implementation that combines both one or more processors running software and hardware logic circuitry.

Figure 11:
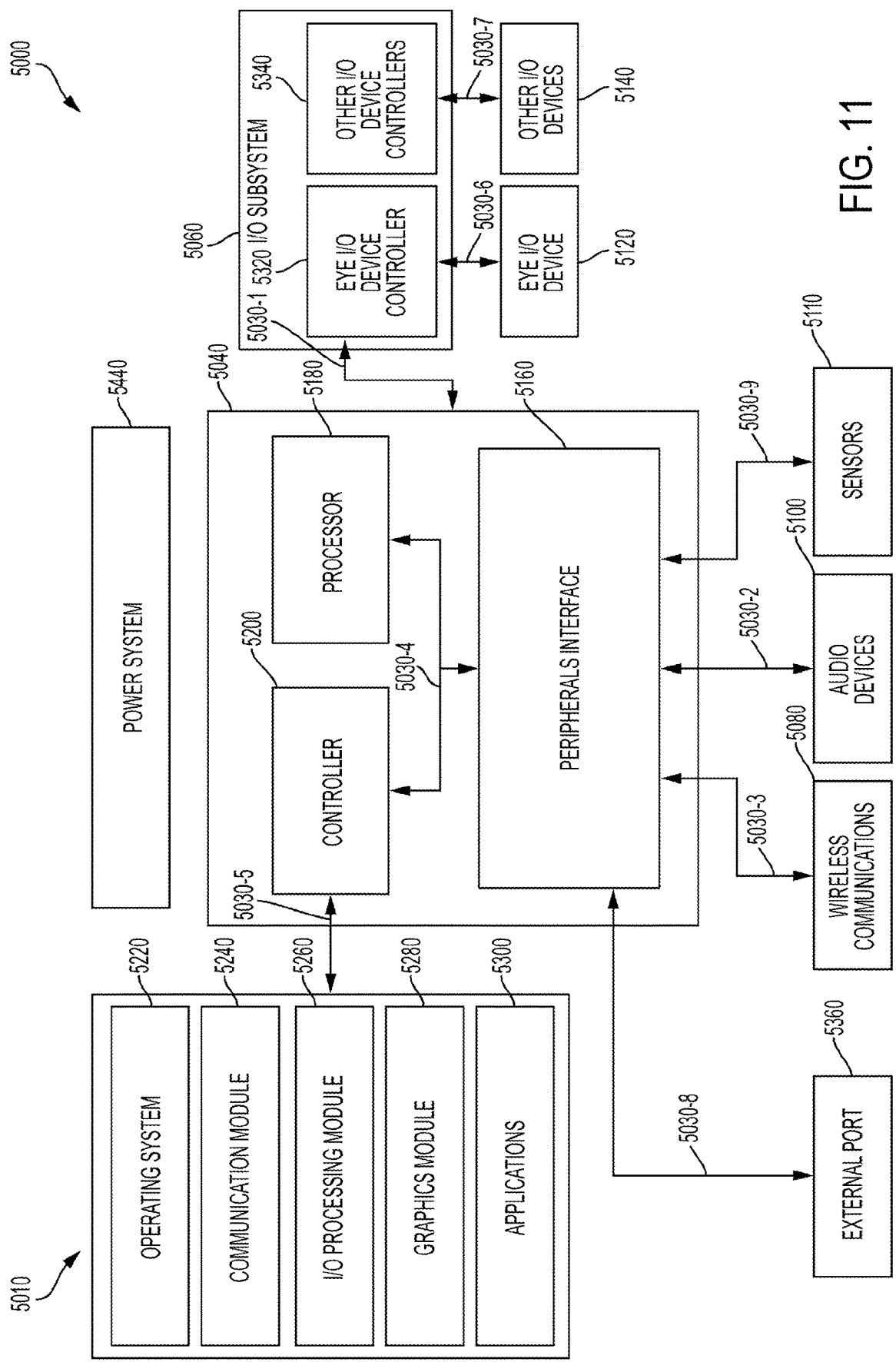
FIG. 11 illustrates an example of a system architecture that may be embodied within any portable or non-portable device.

FIG. 11 illustrates an example system 5000 that may be used to implement any or all of the above examples. Example system 5000 may be included in a portable device (including a wearable device) or a non-portable device—for example, a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, a head-mounted device (which may include, for example, an integrated display), or any other system or device adaptable to include example system 5000, including combinations of two or more of these types of devices. The above examples may be embodied in two or more physically separate devices, such as two or more computers communicating via a wireless network. The above examples may be embodied in two or more physically different devices, such as a belt pack that communicates data to and/or from a head-mounted display device. Example system 5000 includes one or more computer-readable mediums 5010, processing system 5040, I/O subsystem 5060, wireless communications circuitry (e.g., RF circuitry) 5080, audio devices (e.g., speaker, microphone) 5100, and sensors

5110. These components may be coupled by one or more communication buses or signal lines 5030.

The architecture shown in FIG. 11 is only one example architecture of example system 5000, and example system 5000 may have more or fewer components than shown, or a different configuration of components. The various components shown in FIG. 11 may be implemented in hardware, software, firmware or any combination thereof, including one or more digital signal processors (DSP) and/or application specific integrated circuits (ASIC).

Referring to example system 5000 in FIG. 11, the wireless communications circuitry 5080 may be used to send and receive information over a wireless (e.g., RF) link or network to one or more other devices and may include circuitry for performing this function. The wireless communications circuitry 5080 and the audio devices 5100 may be coupled to the processing system 5040 via peripherals interface 5160. The peripherals interface 5160 may include various known components for establishing and maintaining communication between peripherals (e.g., wireless communications circuitry 5080, audio devices 5100, and sensors 5110) and the processing system 5040. The audio devices 5100 may include circuitry for processing voice signals received from the peripherals interface 5160 to enable a user to communicate in real-time with other users. The audio devices 5100 may include, for example, one or more speakers and/or one or more microphones. In some examples, the audio devices 5100 may include a headphone jack (not shown).

The sensors 5110 may include various sensors including, but not limited to, one or more Light Emitting Diodes (LEDs) or other light emitters, one or more photodiodes or other light sensors, one or more photothermal sensors, a magnetometer, an accelerometer, a gyroscope, a barometer, a compass, a proximity sensor, a camera, an ambient light sensor, a thermometer, a GPS sensor, an electrooculography (EOG) sensor, and various system sensors which may sense remaining battery life, power consumption, processor speed, CPU load, and the like. In examples such as involving a head-mounted device (which may include a display), one or more sensors may be employed in connection with functionality related to a user's eye, such as tracking a user's eye movement, or identifying a user based on an image of his or her eye.

The peripherals interface 5160 may couple input and output peripherals of the system 5000 to one or more processors 5180 and one or more computer-readable mediums 5010. The one or more processors 5180 may communicate with the one or more computer-readable mediums 5010 via a controller 5200. The computer-readable medium 5010 may be any device or medium (excluding signals) that may store code and/or data for use by the one or more processors 5180. In some examples, the computer-readable medium 5010 may be a non-transitory computer-readable storage medium. The computer-readable medium 5010 may include a memory hierarchy, including but not limited to cache, main memory and secondary memory. The memory hierarchy may be implemented using any combination of RAM (e.g., SRAM, DRAM, DDRAM), ROM, FLASH, magnetic and/or optical storage devices, such as disk drives, magnetic tape, CDs (compact discs) and DVDs (digital video discs). The computer-readable medium 5010 may also include a transmission medium for carrying information-bearing signals indicative of computer instructions or data (but excluding the signals and excluding a carrier wave upon which the signals are modulated). For example, the transmission medium may include a communications network, including but not limited to the Internet (including the World Wide Web), intranet(s), Local Area Networks (LANs), Wide Local Area Networks (WLANs), Storage Area Networks (SANs), Metropolitan Area Networks (MANs) and the like.

The one or more processors 5180 may run various software components stored in the computer-readable medium 5010 to perform various functions for the example system 5000. In some examples, the software components may include operating system 5220, communication module (or set of instructions) 5240, I/O processing module (or set of instructions) 5260, graphics module (or set of instructions) 5280, and one or more applications (or set of instructions) 5300. Each of these modules and above noted applications may correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, the computer-readable medium 5010 may store a subset of the modules and data structures identified above. Furthermore, the computer-readable medium 5010 may store additional modules and data structures not described above.

The operating system 5220 may include various procedures, sets of instructions, software components and/or drivers for controlling and managing general system tasks (e.g., memory management, storage device control, power management, etc.) and facilitates communication between various hardware and software components.

The communication module 5240 may facilitate communication with other devices over one or more external ports 5360, or via the wireless communications circuitry 5080 and may include various software components for handling data received from the wireless communications circuitry 5080 and/or the external port 5360.

The graphics module 5280 may include various known software components for rendering, animating and displaying graphical objects on one or more display surfaces. Display surfaces may include 2D or 3D displays. Display surfaces may be directly or indirectly coupled to one or more components of the example system 5000. In examples involving a touch sensing display (e.g., touch screen), the graphics module 5280 may include components for rendering, displaying, and animating objects on the touch sensing display. In some examples, the graphics module 5280 may include components for rendering to remote displays. In some examples, such as those incorporating a camera, the graphics module 5280 may include components for creating and/or displaying a image formed by compositing camera data (such as captured from a head-mounted camera) or photographic data (such as satellite-captured imagery) with rendered graphical objects. In some examples, the graphics module 5280 may include components for rendering an image to a head-mounted display device. In some examples, an image may include a view of an element of virtual content (e.g., an object in a three-dimensional virtual environment), and/or a view of the physical world (e.g., camera input indicating the user's physical surroundings). In some examples, a display may present a composite of virtual content and a view of the physical world. In some examples, the view of the physical world may be a rendered image; in some examples, the view of the physical world may be an image from a camera.

The one or more applications 5300 may include any applications installed on example system 5000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

The I/O subsystem 5060 may be coupled to the one or more I/O devices 5140 for controlling or performing various functions. In examples involving processing of eye data, such as examples including eye tracking or iris recognition functionality, the I/O subsystem 5060 may be coupled to the one or more I/O devices 5120 dedicated to handling eye-related input and output. The one or more eye I/O devices 5120 may communicate with processing system 5040 via the eye I/O device controller 5320, which may include various components for processing eye input (e.g., sensors for eye tracking) or user gesture input (e.g., optical sensors). The one or more other I/O controllers 5340 may send and receive electrical signals to and from the other I/O devices 5140. Such I/O devices 5140 may include physical buttons, dials, slider switches, sticks, keyboards, touch pads, additional display screens, or any combination thereof.

The I/O processing module 5260 may include various software components for performing various tasks associated with one or more eye I/O devices 5120 and/or the one or more other I/O devices 5140, including but not limited to receiving and processing input received from the eye I/O devices 5120 via eye I/O device controller 5320, or from the other I/O devices 5140 via I/O controllers 5340. In some examples, the I/O devices 5140 and/or the I/O processing module 5260 may perform various tasks associated with gesture input, which may be provided by tactile or non-tactile means. In some examples, gesture input may be provided by a camera or another sensor for detecting movements of a user's eyes, arms, hands, and/or fingers, for example. In some examples, the one or more I/O devices 5140 and/or the I/O processing module 5260 may be configured to identify objects on a display with which the user wishes to interact—for example, GUI elements at which a user is pointing. In some examples, the one or more eye I/O devices 5120 and/or the I/O processing module 5260 may be configured (such as with the assistance of optical or EOG sensors) to perform eye tracking tasks, such as identifying an object, or a region on a display, at which the user is looking. In some examples, a device (such as a hardware "beacon") may be worn or held by a user to assist the one or more I/O devices 5140 and/or the I/O processing module 5260 with gesture-related tasks, such as identifying the location of a user's hands relative to a 2D or 3D environment. In some examples, the one or more eye I/O devices 5120 and/or the I/O processing module 5260 may be configured to identify a user based on sensor input, such as data from a camera sensor, relating to the user's eye.

In some examples, the graphics module 5280 may display visual output to the user in a graphical user interface (GUI). The visual output may include text, graphics, video, and any combination thereof. Some or all of the visual output may correspond to user-interface objects. In some examples, one or more I/O devices 5120 and/or 5140 and/or controllers 5320 and/or 5340 (along with any associated modules and/or sets of instructions in medium 5010) may detect and track gestures and/or eye movements, and may convert the detected gestures and/or eye movements into interaction with graphical objects, such as one or more user-interface objects. In examples in which the one or more eye I/O devices 5120 and/or the eye I/O device controller 5320 are configured to track a user's eye movements, the user may directly interact with graphical objects by looking at them.

Feedback may be provided, such as by the one or more eye I/O devices 5120 or the one or more other I/O devices 5140, based a state or states of what is being displayed and/or of the example system 5000. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

The example system 5000 may also include power system 5440 for powering the various hardware components and may include a power management system, one or more power sources, a recharging system, a power failure detection circuit, a power converter or inverter, a power status indicator, and any other components typically associated with the generation, management and distribution of power in portable devices.

In some examples, the peripherals interface 5160, the one or more processors 5180, and the controller 5200 may be implemented on a single chip, such as the processing system 5040. In some other examples, they may be implemented on separate chips.

In some examples, a system is disclosed. The system may comprise: an iris imager configured to acquire an iris image; and a processor configured to: receive a first plurality of iris images from the iris imager, generate a first plurality of iris codes corresponding to the first plurality of iris images, generate a distribution metric corresponding to an iris cell location, generate a first composite iris code using the distribution metric, and generate a first match value using the first composite iris code and a first stored iris code. Additionally or alternatively to one or more of the above examples, each iris code of the first plurality of iris codes may comprise a plurality of values, each value of the plurality of values corresponding to an iris cell. Additionally or alternatively to one or more of the above examples, the iris cell location may correspond to a first iris cell, and each iris code of the first plurality of iris codes may comprise a value corresponding to the first iris cell. Additionally or alternatively to one or more of the above examples, the processor may be further configured to: in response to a determination that the first match value exceeds a threshold value, activate a functionality of the system. Additionally or alternatively to one or more of the above examples, the system may further comprise a head-mounted display. Additionally or alternatively to one or more of the above examples, the first composite iris code and the first stored iris code may each be a fuzzy iris code. Additionally or alternatively to one or more of the above examples, the first match value may be at least one of a soft Hamming Distance, a median Hamming Distance, and a fuzzy Z-score. Additionally or alternatively to one or more of the above examples, generating the distribution metric may comprise determining a sample-size-dependent confidence value. Additionally or alternatively to one or more of the above examples, generating the first match value may comprise comparing a confidence interval of the first composite iris code to a confidence interval of the first stored iris code. Additionally or alternatively to one or more of the above examples, generating the distribution metric may comprise determining a probability of a cell value. Additionally or alternatively to one or more of the above examples, generating the distribution metric may comprise quantifying the number of occurrences of a cell value. Additionally or alternatively to one or more of the above examples, an iris code of the first plurality of iris codes may comprise binary cell values and the first composite iris code may comprise non-binary cell values. Additionally or alternatively to one or more of the above examples, the processor may be further configured to: assign a quality score to an iris image of the first plurality of iris images; compare the quality score to a threshold; and in response to a determination that the quality score does not meet the threshold, exclude the iris image. Additionally or alternatively to one or more of the above examples, generating the first match value may comprise calculating a Hamming Distance. Additionally or alternatively to one or more of the above examples, the processor may be further configured to determine whether the first match value corresponds to a complete match. Additionally or alternatively to one or more of the above examples, the processor may be further configured to determine whether the first match value corresponds to a conditional match. Additionally or alternatively to one or more of the above examples, the processor may be further configured to: in response to a determination that the first match value corresponds to a complete match, activating a first functionality of the system; and in response to a determination that the first match value corresponds to a conditional match, activating a second functionality of the system, the second functionality not identical to the first functionality. Additionally or alternatively to one or more of the above examples, the processor may be further configured to: in response to a determination that the first match value corresponds to a conditional match: receive a second plurality of iris images from the iris imager, generate a second plurality of iris codes, generate a second composite iris code, and generate a second match value using the second composite iris code and the first stored iris code. Additionally or alternatively to one or more of the above examples, the first plurality of iris images may comprise a pre-determined minimum number of iris images.

In some examples, a method is disclosed. The method may comprise: receiving a first plurality of iris images; generating a first plurality of iris codes corresponding to the first plurality of iris images; generating a distribution metric corresponding to an iris cell location; generating a first composite iris code using the distribution metric; and generating a first match value using the first composite iris code and a first stored iris code. Additionally or alternatively to one or more of the above examples, each iris code of the first plurality of iris codes may comprise a plurality of values, each value of the plurality of values corresponding to an iris cell. Additionally or alternatively to one or more of the above examples, the iris cell location may correspond to a first iris cell, and each iris code of the first plurality of iris codes comprises a value corresponding to the first iris cell.

In some examples, a system is disclosed. The system may comprise a headgear unit configured to be worn by a user, the headgear unit including: a display configured to display a virtual environment to the user, the display comprising a transmissive eyepiece through which a real environment is visible; an iris imager configured to acquire an image of an iris of the user, the iris imager configured to remain fixed relative to the user; and a processor configured to: receive a first plurality of iris images from the iris imager, the plurality of images associated with the user; generate a first plurality of iris codes corresponding to the first plurality of iris images, generate a distribution metric corresponding to an iris cell location, generate a first composite iris code using the distribution metric, and generate a first match value using the first composite iris code and a first stored iris code, the first match value corresponding to the user.

While this disclosure has been particularly shown and described with references to examples thereof, it will be understood by those skilled in the art that various changes in form and details may be made therein without departing from the scope of the disclosure.

What is claimed is:

1. A system comprising:
    an iris imager configured to acquire an iris image of an iris, the iris image comprising a plurality of iris cells, the plurality of iris cells corresponding to a plurality of iris cell locations; and
    a processor configured to:
        receive a first plurality of iris images of an eye from the iris imager,
        generate a first plurality of iris codes corresponding to the first plurality of iris images of the eye, the first plurality of iris codes comprising first iris codes and second iris codes,
        generate two or more distribution metrics corresponding to the plurality of iris cell locations of the eye, wherein:
            a first distribution metric corresponds to the first iris codes of the first plurality of iris images, and
            a second distribution metric corresponds to the second iris codes of the first plurality of iris images,
        generate bits of a first composite iris code by applying the two or more distribution metrics to the first plurality of iris codes, wherein:
            the first composite iris code is associated with the eye,
            the first distribution metric is applied to the first iris codes to generate a first bit of the first composite iris code for a first iris cell location, and
            the second distribution metric is applied to the second iris codes to generate a second bit of the first composite iris code for a second iris cell location, different from the first iris cell location, and
        generate a first match value by comparing the first composite iris code and a first stored iris code.

2. The system of claim 1, wherein the processor is further configured to:
    in response to a determination that the first match value exceeds a threshold value, activate a functionality of the system.

3. The system of claim 1, further comprising a head-mounted display.

4. The system of claim 1, wherein the first composite iris code and the first stored iris code are each a fuzzy iris code.

5. The system of claim 1, wherein the first match value is at least one of a soft Hamming Distance, a median Hamming Distance, and a fuzzy Z-score.

6. The system of claim 1, wherein generating the two or more distribution metrics comprises determining a sample-size-dependent confidence value.

7. The system of claim 1, wherein generating the first match value comprises comparing a confidence interval of the first composite iris code to a confidence interval of the first stored iris code.

8. The system of claim 1, wherein generating the two or more distribution metrics comprises determining a probability of a cell value.

9. The system of claim 1, wherein generating the two or more distribution metrics comprises quantifying the number of occurrences of a cell value.

10. The system of claim 1, wherein an iris code of the first plurality of iris codes comprises binary cell values and the first composite iris code comprises non-binary cell values.

11. The system of claim 1, wherein the processor is further configured to:
assign a quality score to an iris image of the first plurality of iris images;
compare the quality score to a threshold; and
in response to a determination that the quality score does not meet the threshold, exclude the iris image.

12. The system of claim 1, wherein generating the first match value comprises calculating a Hamming Distance.

13. The system of claim 1, wherein the processor is further configured to determine whether the first match value corresponds to a complete match.

14. The system of claim 13, wherein the processor is further configured to determine whether the first match value corresponds to a conditional match.

15. The system of claim 14, wherein the processor is further configured to:
in response to a determination that the first match value corresponds to a complete match, activate a first functionality of the system; and
in response to a determination that the first match value corresponds to a conditional match, activate a second functionality of the system, the second functionality not identical to the first functionality.

16. The system of claim 14, wherein the processor is further configured to:
in response to a determination that the first match value corresponds to a conditional match:
receive a second plurality of iris images from the iris imager,
generate a second plurality of iris codes,
generate a second composite iris code, and
generate a second match value using the second composite iris code and the first stored iris code.

17. The system of claim 1, wherein the first plurality of iris images comprises a pre-determined minimum number of iris images.

18. A method comprising:
receiving a first plurality of iris images, each iris image of the plurality of iris images corresponding to an iris of an eye and comprising a plurality of iris cells, the plurality of iris cells corresponding to a plurality of iris cell locations;
generating a first plurality of iris codes corresponding to the first plurality of iris images of the eye, the first plurality of iris codes comprising first iris codes and second iris codes;
generating two or more distribution metrics corresponding to the plurality of iris cell locations of the eye, wherein:
a first distribution metric corresponds to the first iris codes of the first plurality of iris images, and
a second distribution metric corresponds to the second iris codes of the first plurality of iris images;
generating bits of a first composite iris code by applying the two or more distribution metrics to the first plurality of iris codes, wherein:
the first composite iris code is associated with the eye,
the first distribution metric is applied to the first iris codes to generate a first bit of the first composite iris code for a first iris cell location, and
the second distribution metric is applied to the second iris codes to generate a second bit of the first composite iris code for a second iris cell location, different from the first iris cell location; and
generating a first match value by comparing the first composite iris code and a first stored iris code.

19. A system comprising:
a headgear unit configured to be worn by a user, the headgear unit including:
a display configured to display a virtual environment to the user, the display comprising a transmissive eyepiece through which a real environment is visible;
an iris imager configured to acquire an image of an iris of an eye of the user, the iris imager configured to remain fixed relative to the user, the image comprising a plurality of iris cells, the plurality of iris cells corresponding to a plurality of iris cell locations; and
a processor configured to:
receive a first plurality of iris images of the eye from the iris imager, the plurality of iris images associated with the iris of the user;
generate a first plurality of iris codes corresponding to the first plurality of iris images of the eye, the first plurality of iris codes comprising first iris codes and second iris codes,
generate two or more distribution metrics corresponding to the plurality of iris cell locations of the eye, wherein:
a first distribution metric corresponds to the first iris codes of the first plurality of iris images, and
a second distribution metric corresponds to the second iris codes of the first plurality of iris images,
generate bits of a first composite iris code by applying the two or more distribution metrics to the first plurality of iris codes, wherein:
the first composite iris code is associated with the eye,
the first distribution metric is applied to the first iris codes to generate a first bit of the first composite iris code for a first iris cell location, and
the second distribution metric is applied to the second iris codes to generate a second bit of the first composite iris code for a second iris cell location, different from the first iris cell location, and
generate a first match value by comparing the first composite iris code and a first stored iris code, the first match value corresponding to the user.

* * * * *